US005543702A

United States Patent [19]
Pfeiffer

[11] Patent Number: 5,543,702
[45] Date of Patent: Aug. 6, 1996

[54] ALKALINE BATTERY CHARGING METHOD AND BATTERY CHARGER

[75] Inventor: John D. Pfeiffer, Quebec, Canada

[73] Assignee: JDP Innovations, Inc., Quebec, Canada

[21] Appl. No.: 14,580

[22] Filed: Feb. 8, 1993

[51] Int. Cl.[6] .................................................. H01M 10/44
[52] U.S. Cl. ................................... 320/15; 320/6; 320/32
[58] Field of Search ................................ 320/2, 4, 5, 6, 320/15, 16, 17, 18, 32, 31

[56] References Cited

U.S. PATENT DOCUMENTS

| | | | |
|---|---|---|---|
| 2,369,033 | 2/1945 | Eubank | 320/4 |
| 3,081,366 | 3/1963 | Belove | 136/6 |
| 3,556,849 | 1/1971 | Oswin et al. | 136/30 |
| 3,563,800 | 2/1971 | Oswin et al. | 136/30 |
| 3,579,075 | 5/1971 | Floyd | 320/2 |
| 3,735,232 | 5/1973 | Fister | 320/2 |
| 3,927,361 | 12/1975 | Macharg | 320/39 |
| 3,979,658 | 9/1976 | Foster | 320/23 |
| 4,016,474 | 4/1977 | Mason | 320/15 |
| 4,031,450 | 6/1977 | Hammel et al. | 320/23 |
| 4,101,818 | 7/1978 | Kelly, III et al. | 320/2 |
| 4,146,830 | 3/1979 | Foster | 320/23 |
| 4,209,736 | 6/1980 | Reidenbach | 320/22 |
| 4,308,493 | 12/1981 | Kothe et al. | 320/35 |
| 4,426,612 | 1/1984 | Wicnienski et al. | 320/39 |
| 4,609,861 | 9/1986 | Inaniwa et al. | 320/32 |
| 4,629,963 | 12/1986 | Morris | 320/3 |
| 4,670,703 | 6/1987 | Williams | 320/22 |

(List continued on next page.)

FOREIGN PATENT DOCUMENTS

| | | |
|---|---|---|
| 0368353 | 5/1990 | European Pat. Off. |
| 2544549 | 4/1977 | Germany |
| WO91/07000 | 5/1991 | WIPO |
| WO92/15142 | 9/1992 | WIPO |
| WO93/15544 | 8/1993 | WIPO |

OTHER PUBLICATIONS

Batteries—Edited by Karl V. Kordesch, vol. I, Manganese Dioxide—Marcel Dekker, Inc. New York 1974—pp. 279–314.

Eveready Battery Applications Engineering Data, 1971, pp. 275–281 and 291–301.

The Technology Of The Rechargeable Alkaline Zn–MnO2 Battery—by K. Kordesch et al., Seventh Australian Electrochemistry conference, Feb. 14–19, 1988.

Buddy L, Super Charger, Product Adertisment, dated Apr. 1994.

Primary Examiner—Robert Nappi
Attorney, Agent, or Firm—Rosen, Dainow & Jacobs Limited Liability Partnership

[57] ABSTRACT

A battery charger and method are disclosed for charging alkaline, Ni-Cad and zinc-based batteries, particularly sizes N, AAA, AA, C and D. For batteries rated at about 1.25 volts to about 1.5 volts, the battery charger and method provide a constant charging current of between about 0.28 ma to about 1.5 ma per gram weight of the battery. A substantially constant current is supplied to the battery while a reference voltage greater than the battery voltage is provided. Thereafter, as the battery voltage increases, the reference voltage is incremented up to a predetermined maximum reference voltage. Charging is terminated when the reference voltage reaches the predetermined maximum, or when the battery voltage does not increase during charging to be greater than a first or a subsequent reference voltage during a predetermined charging time period. The controller may also cause the constant current to be increased by from about 2.5% to about 25% for up to a predetermined testing time period, and terminate the supply of current to the battery if the battery voltage increases by greater than a predetermined amount. The battery charger may at the same time charge batteries of different sizes, and includes a separate constant current circuit for each battery in the battery charger. Each battery is continuously supplied with charging or testing current as determined by the controller, and the controller controls charging of each battery independently of the charge condition of any other battery. A separate controller may control each constant current circuit, or a microprocessor may control all of the constant current circuits.

56 Claims, 8 Drawing Sheets

U.S. PATENT DOCUMENTS

| | | | |
|---|---|---|---|
| 4,755,733 | 7/1988 | Laliberte | 320/15 |
| 4,766,361 | 8/1988 | Pusateri | 320/2 |
| 4,816,735 | 3/1989 | Cook et al. | 320/2 |
| 4,849,682 | 7/1989 | Bauer et al. | 320/15 |
| 4,957,827 | 9/1990 | Kordesch et al. | 429/60 |
| 5,039,929 | 8/1991 | Veistroffer et al. | 320/2 |
| 5,055,763 | 10/1991 | Johnson et al. | 320/15 |
| 5,057,761 | 10/1991 | Felegyhazi, Sr. | 320/2 |
| 5,121,047 | 6/1992 | Goedken et al. | 320/39 |
| 5,157,320 | 10/1992 | Kuriloff | 320/39 |
| 5,177,427 | 1/1993 | Bugaj | 320/20 |
| 5,191,277 | 3/1993 | Ishikura et al. | 320/22 |
| 5,218,286 | 6/1993 | VanDunk | 320/31 |
| 5,350,996 | 9/1994 | Tauchi | 320/22 |

ALKALINE BATTERY CHARGING METHOD AND BATTERY CHARGER

BACKGROUND OF THE INVENTION

The invention disclosed herein relates to charging dry cell batteries, particularly of the alkaline type which are considered non-rechargeable by consumers and now are discarded after the first time they run down. The invention has particular application to recharging 1.5 volt batteries of sizes N, AAA, AA, C and D.

Alkaline manganese dioxide zinc batteries, commonly referred to simply as "alkaline" batteries, e.g., 1.5 volt cells sold under the trademarks DURACELL and EVEREADY ENERGIZER, today are used in thousands of applications from toys, electronics and cameras to flashlights. They are accepted as "single use" batteries, i.e., they are not thought to be rechargeable and are thrown away when they run down. (Battery manufacturers have long known that secondary alkaline batteries are safely rechargeable. For example, see pages 275–281 and 291–301 of *Eveready Battery Applications Engineering,* 1971.) Even though not considered by most people to be rechargeable, alkaline primary batteries are preferred over rechargeable nickel cadmium ("Ni—Cad") batteries and the older zinc-based batteries because they typically last several times longer, do not contain acid which in the zinc-based cells are prone to leaking, work well with high current drain devices (unlike the Ni—Cad batteries), are much cheaper than Ni—Cad batteries and are also cheaper than zinc-based batteries on a per-unit of power delivered basis, withstand the cold best and have the longest shelf life. Though rechargeable, Ni—Cad batteries are only rated at 1.25 volts when new, as compared to a 1.5 volt rating for alkaline batteries, and the capacity of Ni—Cad batteries decreases with repeated recharging. Ni—Cad batteries also give little or no warning when they are about to run out, which poses problems in portable computer applications. The superiority of alkaline batteries over Ni—Cad and zinc-based batteries is reflected in their respective sales. The size of the U.S. market is thought to easily exceed one billion dollars annually, two-thirds of which is alkaline battery sales.

Despite the overwhelming superiority of alkaline batteries, and the fact that they are known by those skilled in the battery art to be rechargeable, as far as the applicant is aware, there is no commercially available alkaline battery charger; therefore, they all end up in the trash after a single use. Not only do the millions of discarded alkaline batteries form a source of heavy metal environmental pollution, but they needlessly cost consumers millions of dollars a year in replacement batteries.

The Eveready publication, cited above, discloses a method and a charging circuit for recharging alkaline manganese dioxide zinc batteries. The patent literature also discloses methods and charging circuits for recharging batteries which were generally accepted by consumers as being non-rechargeable. The following disclose methods and circuits for charging alkaline batteries: International PCT Publication WO 91/07000 (published May 16. 1991, Szorady et al.), and U.S. Pat. Nos. 4,308,493 (Kothe et al.), 4,031,450 (Hammel et al.) and 3,735,232 (Fister). U.S. Pat. No. 4,629,963 (Morris) discloses a method and circuit for recharging dry cells "that once discharged . . . are normally replaced." The following disclose methods and circuits for recharging zinc-based batteries: U.S. Pat. Nos. 3,556,849 (Oswin et al.), 3,563,800 (Oswin et al.) and 2,369,033 (Eubank). U.S. Pat. No. 3,081,366 (Belove) discloses a sealed, rechargeable alkaline battery with an automatic charging cut-off circuit within the battery.

The patent literature discloses many battery charging methods and circuits for charging Ni—Cad and other batteries which use many different techniques and circuits. Recently, battery charging circuits have been disclosed which are microprocessor controlled. See, for example, U.S. Pat. No. 5,055,763 (Johnson et al.).

There is, however, a need for a battery charging method and charger which safely recharges alkaline batteries, and which preferably recharges Ni—Cad and zinc based batteries as well, and for a battery charger particularly for recharging alkaline batteries which is relatively simple and inexpensive to manufacture. There is also a need for such a battery charger which accepts different size batteries for recharging (for example, N, AAA, AA, C and D), so that the same recharger may be used to recharge all or most of the batteries used in a typical household, office, etc.

OBJECTS AND SUMMARY OF THE INVENTION

It is an object of the invention disclosed herein to recharge alkaline batteries, particularly sizes N, AAA, AA, C and D.

Another object of the invention is to provide a method and battery charger which accurately and reliably determine when a battery has been recharged, particularly alkaline batteries.

Another object of the invention is charge in the same battery charger different size batteries at the same time, preferably without adjustment of the battery charger by a user either to accept different size batteries or to select one or more charging parameters, e.g., charging current, for the particular battery being charged.

Another object of the invention is to provide a battery charger which is completely automatic from placement of a battery into the battery charger to terminating recharging either because the battery has been successfully recharged or it is considered unrechargeable by the battery charger.

Another object of the invention is to provide a battery charger which achieves any or all of the above objects and which is relatively simple and inexpensive to manufacture.

Another object of the invention is to provide a battery charger which indicates the charge condition of the battery during charging.

The above and other objects are achieved by the invention disclosed herein by supplying a constant current to a battery under charge, and monitoring the battery voltage relatively frequently, preferably substantially throughout the time it is being charged, and terminating charging upon the occurrence of one or more specified conditions. Such conditions may involve a relationship of the battery voltage and a reference voltage, and/or a relationship of the battery voltage, a reference voltage and time. Different predetermined constant currents are preferably provided for different batteries. For alkaline batteries, the constant current supplied to the battery being charged is relatively low, and for N, AAA, AA, C and D sizes, the nominal constant charging current is in the approximate range of from about 0.25 ma per gram weight of the battery to about 1.25 ma per gram, depending on the particular size of the battery. However, the actual value used may be from about 80% to about 150% of the nominal value.

In accordance with preferred embodiments, charging is terminated when the battery voltage does not increase by a predetermined value within a predetermined charging time period or when the battery voltage reaches a predetermined maximum voltage value.

The invention also provides a method for testing the charge condition of the battery. Although simple and applied from the outside of the battery, the method tests internal conditions of the battery being charged. In the preferred embodiment, the test is conducted while the battery is being charged without interrupting charging. This is accomplished in accordance with the invention by increasing the charging current being supplied to the battery by a predetermined amount for up to a predetermined testing time period, and either continuing or terminating charging depending upon the reaction of the battery to the increased, or "test", current. In the preferred embodiment, charging is continued if the battery voltage does not increase by a predetermined amount while the test current is supplied to the battery during the predetermined testing time period, or if the battery voltage reaches the predetermined maximum voltage referred to above.

A battery charger according to the invention comprises a control circuit which makes the operation automatic. This circuit receives an input corresponding to the voltage across the battery and also from a timing means, beginning when the battery is first inserted into a holder of the charger. Logical programs are incorporated, either in hardware or in dedicated microprocessor control, which follow the changes of voltage with time, and the control circuit causes charging or test current to be applied in such a manner that the values of current supplied and the times they are supplied are optimized without overcharging the battery. Charging is automatically terminated when one of five possible conditions is attained: (1) a preset maximum value of battery voltage is reached; or (2) a fixed time interval (predetermined charging time period) elapses during which the battery voltage does not increase by a predetermined amount; or (3) in response to a predetermined increase in the charging current (i.e., in response to a test current), the battery voltage increases by a predetermined amount during the time of application of the test current (predetermined testing time period); or (4) the preset maximum value of battery voltage is reached in an abnormally short time from the start of charging; or (5) the battery voltage measured shortly after the start of the charging is abnormally low.

A battery charger according to the invention is capable of charging different size batteries without adjustment of any kind by the user. A battery charger according to the invention comprises a means for detecting the size of a battery mechanically and in response thereto setting the magnitudes of current supplied during charging. However, in applications where only one battery size is accepted, such automatic detection of size is not required without departing from the invention. The battery size detecting means is adjustable to physically accept different size batteries, and adjustment of the detecting means causes the battery charger to automatically adjust the magnitude of the current supplied to each battery connected in the battery charger in accordance with battery size. The invention accomplishes this by simply changing the value of resistance in series with the battery according to the physical size of the battery.

The invention further provides for continuously charging a number of batteries (same or mixed sizes) simultaneously while controlling charging of the batteries. In accordance with the invention, the supply or termination of current to each battery is independently controlled. The batteries are charged simultaneously in the sense that all batteries may be receiving current at the same time or in any combination. As a result, the charge condition of each battery is independently determined, and charging of any battery may be terminated without regard to the charge status of any other battery. Additionally, simultaneous supply of current to all batteries being charged speeds up charging the batteries in comparison to the multiplexed or time-shared technique frequently used in microprocessor controlled chargers.

The invention not only provides for recharging batteries of intermixed sizes, but also different types of both primary and secondary cells of alkaline, Ni—Cad or zinc construction. Thus, a battery charger according to the invention has the capability of charging intermixed size and type batteries.

A battery charger according to the invention includes a current source for supplying current to a battery, which is capable of automatically being switched on and off and is also capable of supplying a current automatically adjusted to the size of battery being charged, and to supply this current at two or more different magnitudes.

A battery charger according to the invention indicates the charge condition of each battery being charged. Preferably, light emitting drodes (LEDs) are used, although other types of displays may also be used. In the preferred embodiment, red and green LEDs are employed. The red LED indicator may be used to signal for conditions (4) or (5) above, indicating a battery which cannot be recharged (dead). The green LED may be used to signal condition (4), indicating that the cell was new or nearly new and is ready for use, if the initial voltage of the battery measured shortly after inserting it was very high e.g., (>1.55 v). The green LED may also signal conditions (1) (2) or (3) upon termination of charging. If more detailed reporting is desired, assorted colors of LEDs can be used. For example, a yellow rather than the green LED may be used to indicate condition (1). The values of battery voltage are continuously available for the batteries in the charger in digital form, and may be presented on digital liquid crystal displays, if desired. The control circuit may be realized by integrated logic circuits, or in single-crystal silicon dies (VLSI or ASIC construction), or in a microprocessor.

In specific embodiments of the invention, the battery charger comprises controlled means, (e.g., a constant current circuit) for supplying current to a battery under charge and controlling means (e.g. a control circuit) for controlling the controlled means to cause the controlled means to supply a substantially constant charging current to the battery as the voltage of the battery changes during charging of the battery, and to terminate the supply of the current to the battery under specified conditions. The controlling means including means for providing an adjustable reference voltage and causing the controlled means to supply substantially constant current to the battery while causing the reference voltage means to provide a first reference voltage which is greater than the battery voltage, and to thereafter provide increased reference voltages, up to a predetermined maximum voltage, which exceed the battery voltage and which exceed a previous reference voltage as the battery voltage increases during charging. The controlling means causes the controlled means to terminate the supply of current to the battery when the reference voltage means provides the predetermined maximum voltage (condition (1) above), or when the battery voltage does not increase during charging to be greater than the first or then current reference voltage during any charging time period (condition (2) above).

Also, the controlling means causes the controlled means to supply a substantially constant charging current to the battery as the voltage of the battery changes during charging of the battery, or to supply a substantially constant test current to the battery which exceeds the charging current by from about 2.5% to about 25% for up to a predetermined testing time period, and to terminate the supply of current to the battery when the battery voltage increases by greater than a predetermined amount.

In the preferred embodiment, the reference voltage is increased in discrete fixed increments.

For batteries having a rated voltage in the order of 1.5 volts (including Ni—Cad batteries rated at 1.25 volts), the reference voltage may be incremented in fixed steps of from 0.005 volt to about 0.05 volt. In the preferred embodiments, the reference voltage is incremented in 0.01 volt steps.

Also, in the preferred embodiment: the predetermined maximum battery voltage (condition (1)) is about 1.6 volts; the predetermined charging time period for terminating charging, if the battery voltage does not increase by a predetermined amount within the predetermined charging time period (condition (2)) is from about 45 minutes to about 2 hours; the predetermined testing time period for applying test current (condition (3)) is from about 10 seconds to about 60 seconds; the abnormally short time in which the maximum voltage was reached (condition (4)) is from about 20 seconds to about one hour; and the abnormally low voltage (condition (5)) is less than about 0.85 volt;

In the preferred embodiment, the controlled means comprises a valve element coupled to a source of direct current and the battery such that when the controlled means is supplying the charging current, the charging current is maintained substantially constant by action of the valve element as the battery voltage changes. The controlling means causes a control signal of a one value to be supplied to the valve element when causing the controlled means to provide the charging current, causes a control signal of another value to be supplied to the element when causing the controlled means to provide the test current, and causes a control signal of still another value to be supplied to the valve element when causing the controlled means to terminate the supply of current to the battery. The controlled means also comprises a resistive element coupled in series between the source of direct current and the battery, and the valve element and the resistive element are coupled such that when the controlled means is supplying the charging or the test current to the battery, the voltage across the resistive element is maintained substantially constant by action of the valve element as the battery voltage changes. The valve element is preferably a transistor.

The controlled means is coupled to a source of direct current having a substantially constant voltage, e.g. 5 volts for charging 1.25 volts–1.5 volts rated batteries, which is greater than the battery voltage when the battery is substantially fully charged.

In the preferred embodiment, the battery charger comprises a plurality of controlled means, each including a means for holding therein a single battery for receiving charging current. The controlling means causes each controlled means to supply substantially constant charging current to the battery held by the respective battery holding means essentially independently of any other controlled means such that two or more controlled means may supply charging current to respective batteries continuously and simultaneously in response to the controlling means, and to terminate charging of respective batteries in response to the controlling means. The controlling means may comprise a separate means for each controlled means or a common controlling means for all controlled means.

In the preferred embodiment, the battery charger includes an adjustable circuit which controls the magnitude of the charging current supplied by a controlled means to the particular battery held by a battery holding means. The adjustable circuit is responsive to the battery size detecting means, which comprises at least one movably mounted contact element in the holding means for electrically connecting the battery in the battery holder. The contact element is movably mounted in the battery holding means to accommodate and electrically connect batteries of different sizes. Means mechanically couple the at least one contact with the adjustable circuit such that movement of the at least one contact adjusts the adjustable circuit and causes the adjustable circuit to provide charging currents of values dependent upon movement of the at least one contact.

The adjustable circuit comprises resistance, and movement of the at least one contact adjusts the value of the resistance. The resistance is coupled in series with the contact means and is the resistive value referred to above connected in series with the valve element and the battery.

A method according to the invention for charging a battery, particularly but not exclusively an alkaline battery, comprises supplying a substantially constant current to the battery and providing a variable reference voltage including providing a first reference voltage which is greater than the voltage of the battery under charge, thereafter increasing the reference voltage up to a predetermined maximum voltage when the battery voltage rises above the reference voltage within a predetermined charging time period, and terminating the supply of current to the battery when the battery voltage does not rise above the reference voltage within the predetermined charging time period or when the reference voltage reaches the predetermined maximum voltage.

As indicated above, the reference voltage is preferably increased by discrete amounts up to the predetermined maximum reference voltage each time that the battery voltage rises above the reference voltage within the predetermined charging time period. The method may also include increasing from time to time the charging current being supplied to the battery by from about 2.5% to about 25% for up to a predetermined testing time period and maintaining the increased charging current substantially constant during the predetermined testing time period, and terminating the supply of current to the battery when the battery voltage increases by a predetermined amount within the predetermined testing time period while the increased, substantially constant charging current is being supplied to the battery.

The above and other objects, advantages, aspects and features of the invention will be more readily perceived from the following description of the preferred embodiments taken with the accompanying drawings and claims.

BRIEF DESCRIPTION OF THE DRAWINGS

The invention is illustrated by way of example and not limitation in the figures of the accompanying drawings in which like references denote like or corresponding parts, and in which.

DESCRIPTION OF THE PREFERRED EMBODIMENTS

Figure 1:
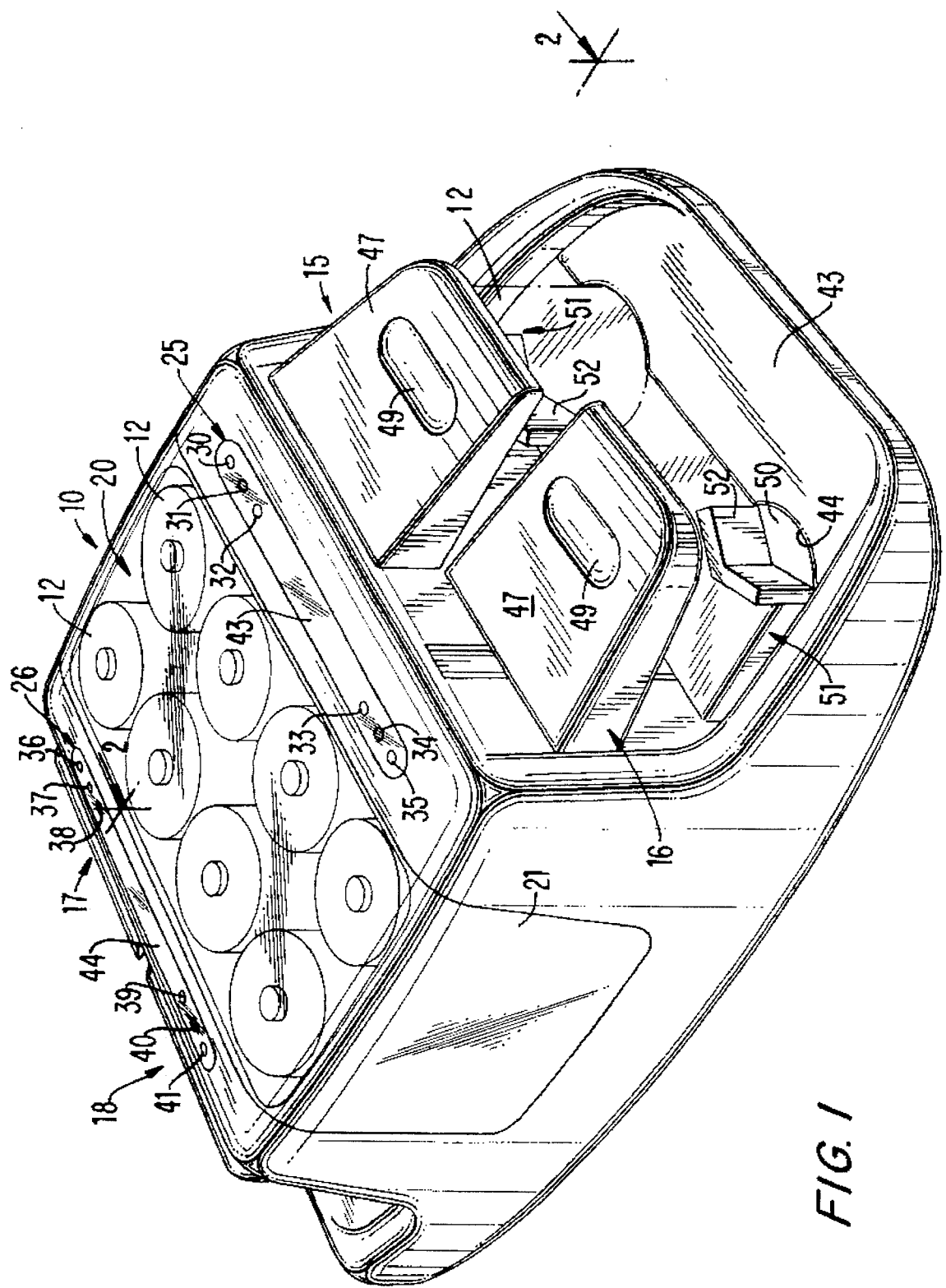
FIG. 1 is a perspective view of a battery charger incorporating the invention which includes a plurality of battery holders for holding a plurality of same or different size batteries to be charged, the battery charger being depicted holding one battery to be charged.

The battery charger 10 depicted in FIG. 1 may receive and charge up to four batteries, only one of which 12 is shown in broken lines. Battery charger 10 includes four identical battery holders 15, 16, 17 and 18, one pair 15, 16 of which being located at one side of battery charger 10 and another pair 17, 18 being located at the opposite side. Between the oppositely located pairs of battery holders 15, 16 and 17, 18 is a battery storage compartment 20 (FIG. 2) for holding up to eight batteries 12, most of which will typically have been recharged so that recharged batteries will usually be available. A removable cover 21 closes the top of battery storage compartment 20. Located next to each pair of battery holders 15, 16 and 17, 18 are display panels 25, 16 holding light emitting diodes(LEDs) 30–41 for battery holders 15–18. Three LEDs are provided for each holder 15–18. Each display panel 25, 26 includes a transparent plastic strip 29, 28 which covers LEDs 30–35 and LEDs 36–41, respectively. LEDs 30–32 are shown schematically in FIG. 6 for one control circuit and LEDs 30–41 are shown schematically in FIG. 7 for the computer-implemented control circuit of FIG. 7.

Battery holders 15–18 are identical. Therefore, the following description of battery holder 15 applies to battery holders 16–18.

Figure 2:
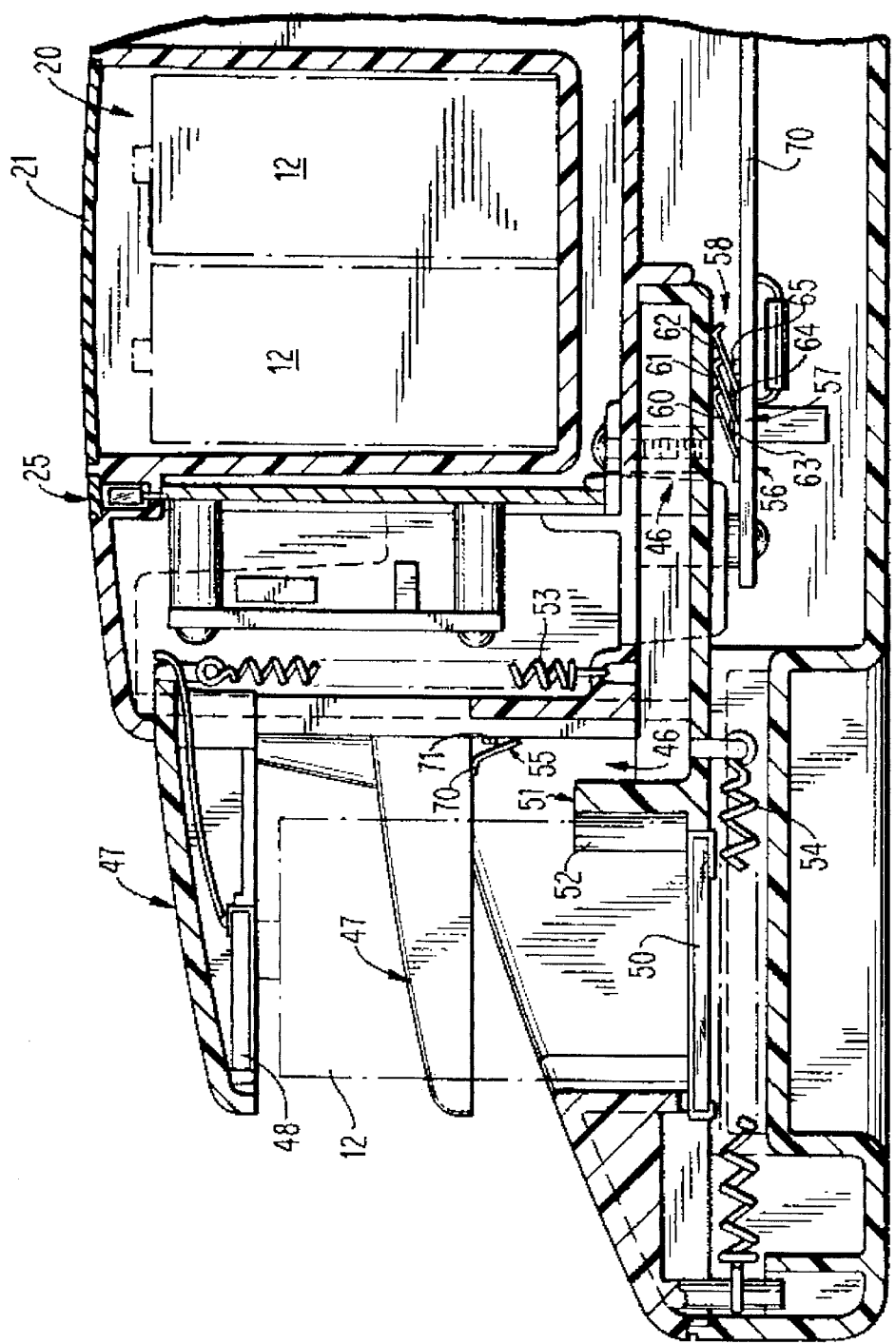
FIG. 2 a section view of a portion of the battery charger of FIG. 1 taken along line 2—2 of FIG. 1.
Figure 5:
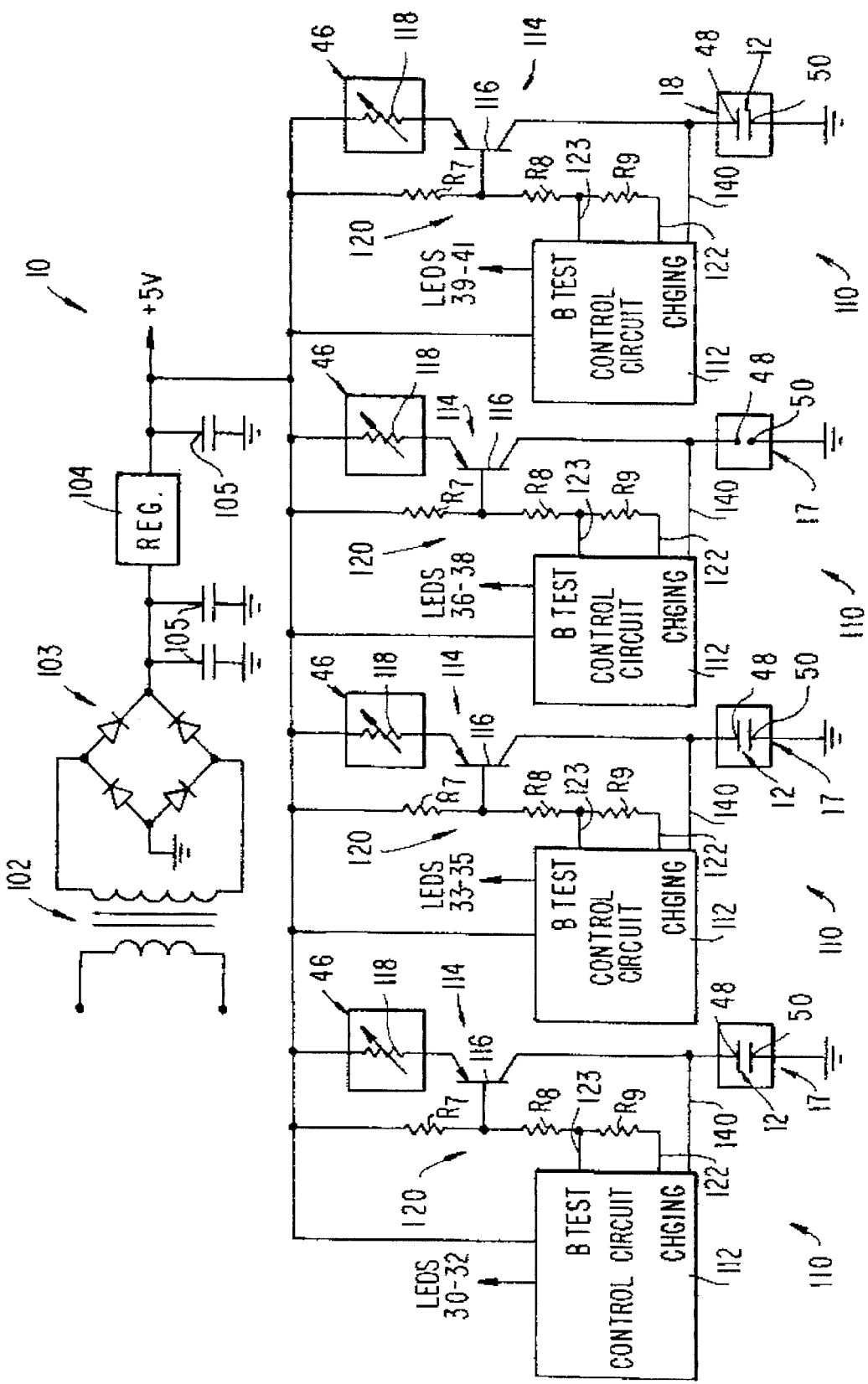
FIG. 5 is a block and schematic diagram of one embodiment of control and constant current circuitry according to the invention for the battery charger of FIG. 1.
Figure 6:
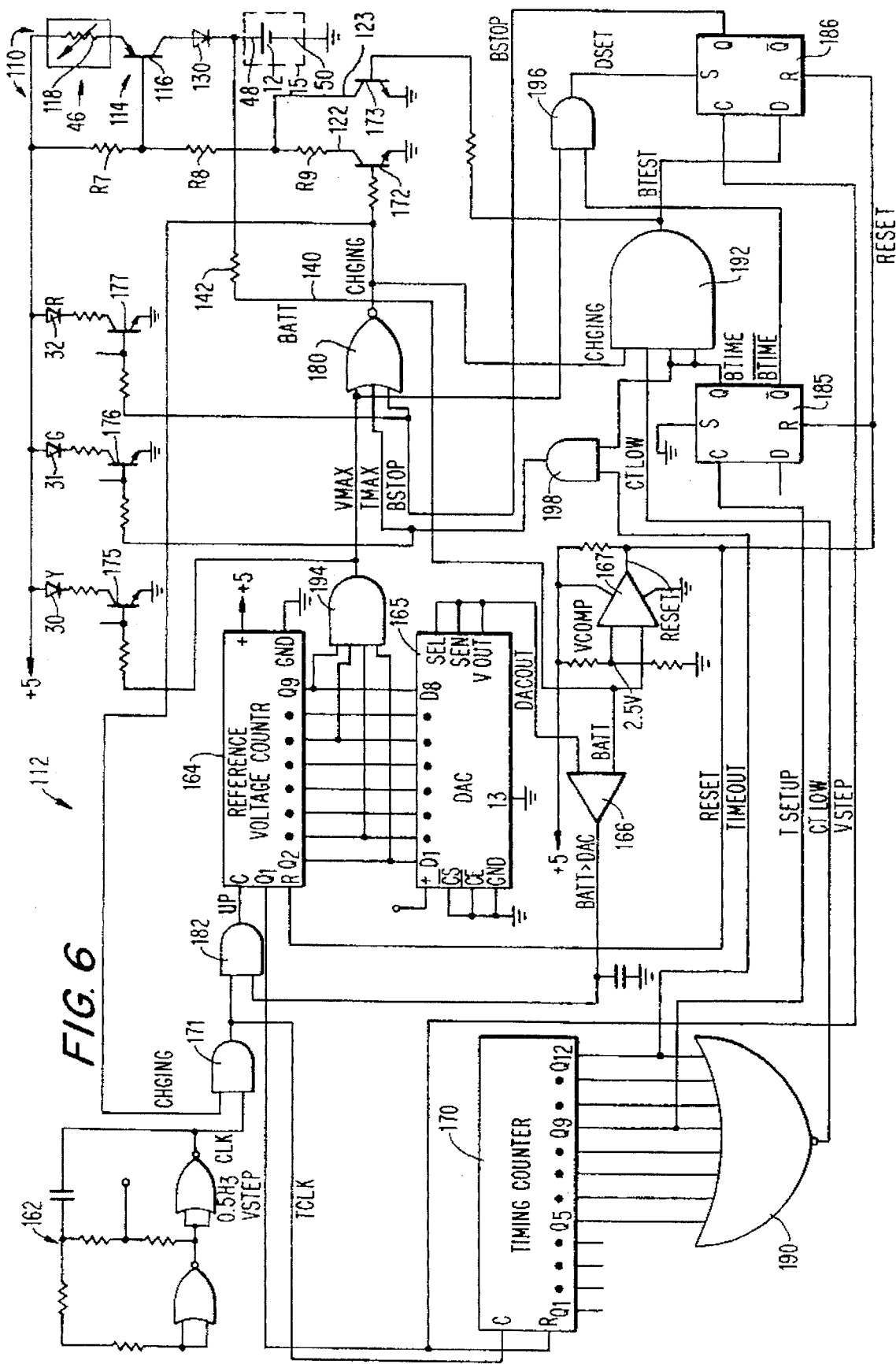
FIG. 6 is a schematic diagram of one control circuit and one constant current circuit of the embodiment depicted in FIG. 5.
Figure 7:
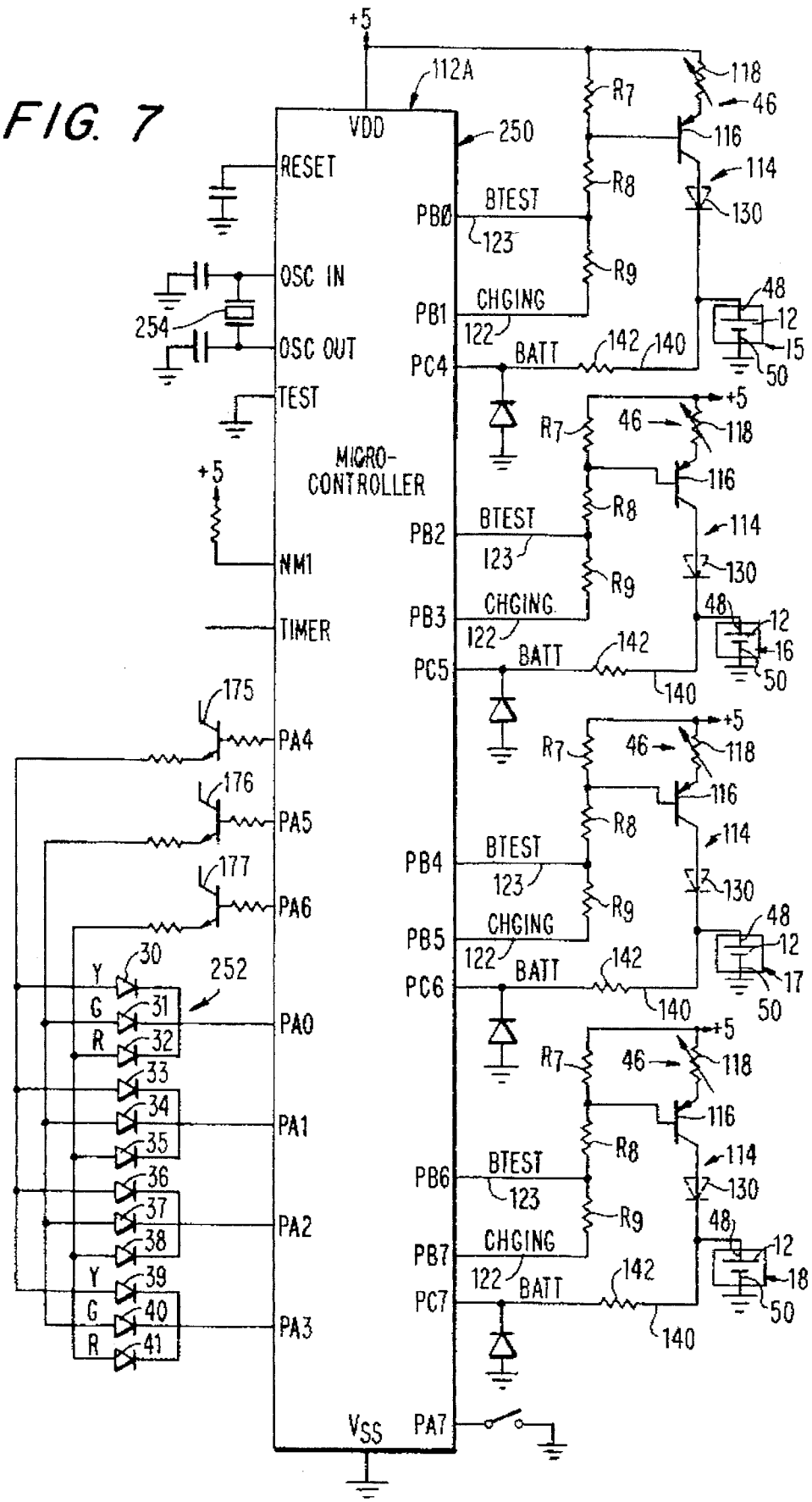
FIG. 7 is a schematic diagram of a computer implemented embodiment of a control circuit and a number of constant current circuits for the battery charger of FIG. 1.

Referring to FIGS. 1 and 2, an upper spring-based battery engaging member 47, has mounted to its underside an upper contact 48 (FIG. 2) for electrically contacting the positive terminal of the battery 12 placed in battery holder 15. Contact 48 is about the same size and approximately in the same location as a depression 49 on the upper side of each upper battery engaging member 40. A lower contact 50 (shown for battery holder 16 in FIG. 1) is located below contact 48 to electrically contact the negative end of battery 12. Lower contact 50 (FIG. 1) is slightly recessed relative to a lower body portion 43 of battery holder which is curved thereat to form a curved lip 44. Slidably mounted above lower contact 48 is a slide member 51 having a V-shaped recess 52 on the outer side thereof facing curved lip 44. Lower contact 50 extends inwardly a substantial distance (FIG. 2) and has a substantial width to ensure electrical contact with the negative end of a battery 12 placed in battery holder 15. Contacts 48 and 50 are sized and positioned to ensure electrical contact with any of battery sizes N, AAA, AA, C and D, and are electrically connected in battery charger 10 as shown in FIGS. 5–7. A battery is seated on lower contact 50 engaged between v-shaped recess 52 and curved lip 44, as described below:

Referring to FIG. 2, upper battery holding member 45 is slidably mounted and is urged downwardly by a spring 53 to the lowermost position shown in FIG. 1 for battery holder 16 such that the height of upper contact 48 above lower contact 50 is less than the height of the shortest battery (an N size battery). Slide member 51 above lower contact 50 is also slidably mounted and is urged outwardly by a spring 54 to the outermost position shown in FIG. 1 for battery holder 16. Referring to FIG. 1, to insert a battery into a battery holder 15–18, the battery positive terminal is placed under upper member 47, and the battery is pushed inwardly against V-shaped recess 52 and upwardly against upper member 47 to seat the battery on the respective lower contact 50 between the v-shaped recess 52 and curved lip 44 in the respective battery holder 15–18. The force of springs 53 and 54 cause the battery to be engaged in the lower contact 50 between v-shaped recess 50 and curved lip 44.

Figure 3:
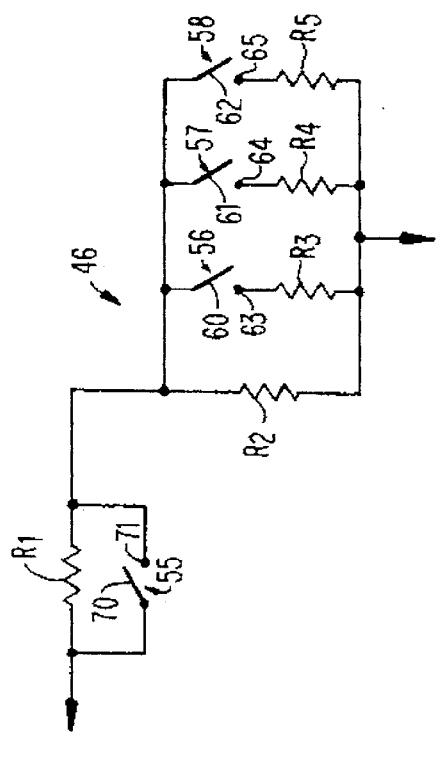
FIG. 3 is a schematic diagram showing the battery size determining arrangement according to the invention which automatically connects selected resistance into a constant current circuit corresponding to the size of the battery connected to the battery holder for that constant current circuit.
Figure 4:
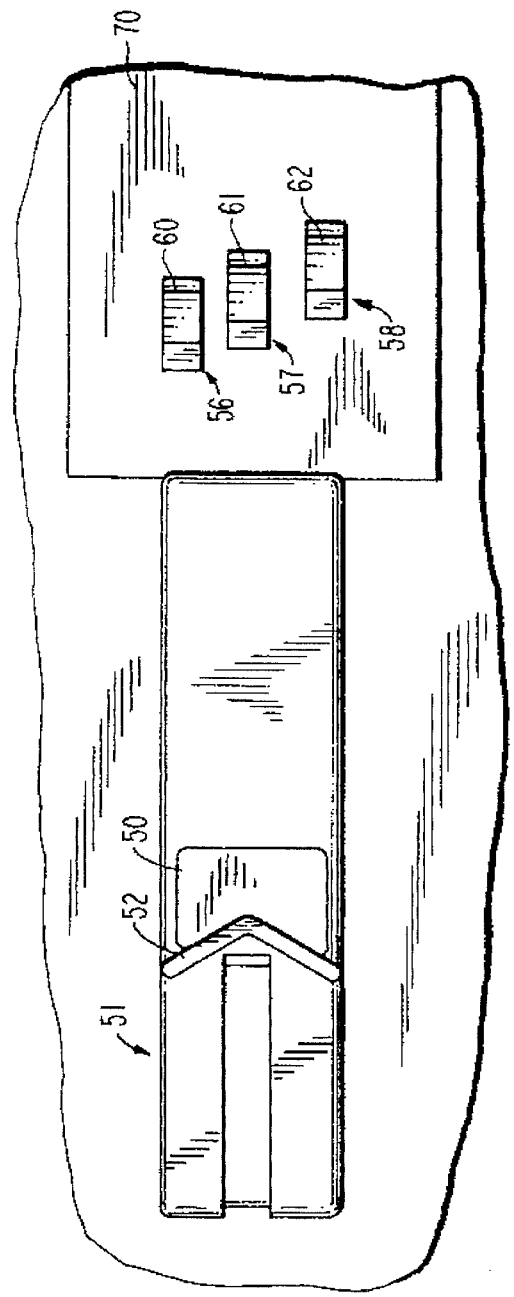
FIG. 4 is a top view of a portion of the battery charger of FIG. 1 showing the switch contacts of the battery sizing arrangement for one of the battery holders which are activated by a lower slide member of that battery holder.

Referring to FIGS. 2 and 3, a battery size detecting or determining arrangement referenced generally by 46 comprises switch 55 activated by movement of upper battery engaging member 47 and switches 56, 57 and 58 activated by movement of slide member 51. FIG. 2 shows switch 55 positioned to be activated to close by upward movement of upper battery engaging member 47 and switches 56–58 positioned to be activated by movement of slide member 51. As shown in FIG. 3, switches 56–58 are located side-by-side offset in the direction of movement of slide member 51. Each switch 56–58 includes a movable contact 60–62 and a fixed contact 63–65 mounted on a PC board 70 to which other components of the battery charger 10 are also mounted. As slide member 51 moves inwardly, it activates switches 56, 57 and 58 sequentially depending on the distance moved. Thus, switch 56 alone may be activated, or both switches 56 and 57 may be activated or all three switches 56, 57 and 58 may be activated. FIG. 2 shows switches 56–58 activated (closed) for a D size battery held by battery holder 15. Switch 55 (FIGS. 2 and 3) which is activated by upper battery engaging member 47 includes a movable contact 70 and a fixed contact 71 which are wire-connected (not shown) to PC board 70. Switch 55 is in the open position when no battery or an N battery is held in a battery holder 15–18, as depicted in FIG. 2. Switch 55 remains open when an N size battery is seated in a battery holder, which requires little upward movement of upper battery engaging member 47 that is insufficient to close switch 55. However, to seat an AAA, AA, C or D size battery, upper battery engaging member 40 must be moved a distance sufficient to close contacts 70 and 71 of switch 55.

In the battery sizing arrangement 47, as shown in FIG. 3, switch 55 switches resistor $R_1$, switch 56 switches resistor $R_3$, switch 57 switches resistor $R_4$ and switch 58 switches resistor $R_5$. Switches 55–58 thus switch resistors in or out of the battery sizing arrangement 46 provides a resistance value in series with transistor 116 (FIG. 5.) as shown in Table I, where the notation $R_1//R_2$ means the resistance value of $R_1$ in parallel with the resistance value of $R_2$, etc.

TABLE I

| BATTERY SIZE | SWITCH CONDITIONS | RESISTANCE |
|---|---|---|
| N | 55 open; 56–58 open | $R_1$ & $R_2$ |
| AAA | 55 closed; 56–58 open | $R_2$ |
| AA | 55–56 closed; 57–58 open | $R_2 // R_3$ |
| C | 56–57 closed; 58 open | $(R_2 // R_3) // R_4$ |
| D | 55–58 closed | $(R_2 // R_3) // R_4) // R_5$ |

As shown in FIG. 5, battery charger 10 comprises a transformer 102, a full wave bridge rectifier 103, a voltage regulator 104 and filter capacitors 105 which provide a regulated DC voltage of about volts, and four identical battery charging circuits 110. In the embodiment shown in FIG. 5, each battery charging circuit 110 includes a separate control circuit ("the controlling means") 112 and a separate constant current circuit 114 ("the controlled means") for each battery holder 15–18). Constant current circuit 114 includes a transistor 116 coupled in series with a respective battery 12 seated in a respective battery holder. FIG. 5 shows batteries connected in holders 15, 16 and 18. Each control circuit 110 is coupled to three LED indicators 30–32, 33–35, 36–39 and 40–42 (see FIGS. 1, 6 and 7), which are controlled by respective control circuits 112. Coupled in each constant current circuit 114 is a battery size determinating arrangement 46 described above which switches a predetermined amount of resistance 118 in series with transistor 116 corresponding to the size of the battery held by the respective battery holder.

As depicted in FIG. 5, each battery charging circuit 110 includes a separate control circuit 112 and a separate constant current circuit 114 so that charging, testing and monitoring of each battery 12 is completely independent of charging, testing and monitoring of any other battery. The battery charging circuits 110 (including the control circuits 112, the constant current circuits 114 and the battery size determining arrangement 46) are identical. Therefore, the following description for one of the battery charging circuits 110 shown in FIGS. 5 and 6 applies to the others.

Referring to FIG. 5, a constant current circuit 114 includes transistor 116, resistance referenced generally by 118, transistor bias resistance referenced generally by 120 and control inputs 122 and 123 which are coupled to control circuit 112. Control circuit 112 supplies on control inputs 122 and 123 either a low signal (approximately ground) to sink any current on the respective control inputs 122 and 123, or a high signal (an approximate open circuit, e.g., an open collector or drain) on respective control inputs 122 and 123. Resistors $R_7$, $R_8$ and $R_9$ of bias resistance 120 are selected to provide the nominal charging and test currents in Table II below for a transistor 116 such as, for example, an MV 5774C or an 8550, or equivalent, and a series resistance 118 value given in Table II when operating from a DC supply voltage of +5 volts. Charging current is provided when control input 122 is low (i.e., on) and control input 123 is open (i.e., off); test current is provided when control input 123 is low and control input 122 open or low; and no current is provided when control inputs 122 and 123 are both open. Both a charging current and a test current function to charge a battery, as described below. However, the test current is also used to determine the state of charge of a battery, as described below.

The nominal values of resistors $R_7$, $R_8$ and $R_9$ are 820 ohms, 1.5K ohms and 560 ohms, respectively. However, the values may vary depending upon the transistor used and the charging and test current values desired.

Voltage regulator 104 supplies sufficient current at +5 volts output to charge and test four N, AAA, AA, C or D size 1.5 volt alkaline or nickel cadmium batteries (1.25 v) in any combination of sizes in accordance with the invention, and to supply current to power the various circuits in battery charger 10 and light the various LEDs in battery charger 10. Total maximum current draw is in the order of 0.5 amperes. The preferred nominal charging current for each size battery (either alkaline or nickel cadmium), the preferred nominal test current, and the series resistance value 118 which produces the nominal currents are given in Table II for a typical transistor 116 (such as MV5774C or 8550) biased as shown in FIG. 6.

TABLE II

| Battery Size | Preferred Nominal Charging Current | Preferred Nominal Test Current | Series Resist. 118 In Ohms For Nominal Current |
|---|---|---|---|
| N | 8.4 ma | 12.2 ma | 87 |
| AAA | 9.73 ma | 14.2 ma | 75 |
| AA | 14.6 ma | 21.4 ma | 50 |
| C | 47.8 ma | 70 ma | 15.27 |
| D | 63.4 ma | 93.8 ma | 11.53 |

The preferred nominal charging current is about 1 ma per gram for N, AAA and AA sizes, about 0.73 ma per gram for C size and about 0.36 to about 0.49 ma per gram for D size. However, the charging current for the different sizes may vary over a range of values and still effectively charge alkaline and nickel cadmium batteries in accordance with the invention. This range is from about 80% of the preferred nominal valve to about 150% of the preferred nominal value, i.e., from about 0.28 ma per gram to about 1.5 ma per gram. The values for the test current, which is boosted or increased over the charging current, is from about 1.025 to 1.25 times the charging current for the respective battery size, i.e., an increase of from about 2.5% to about 25% over the particular charging current. The preferred range for the testing current is 1.025 to 1.10 times the particular charging current, i.e., a 2.5%–10% increase, and a nominal increase of 5% is preferred.

When control circuit 112 determines that charging current should be supplied to a particular battery 12, control circuit 112 outputs a low to control or drive input 122 and an open to control input 123 to supply a control signal to the control input (base) of transistor 116 which turns transistor 116 on so as to supply the nominal charging current given in Table II. When control circuit 112 determines that test current should be supplied to the particular battery, control circuit 112 outputs a low to control input 123 and either an open or a low to control input 122, which supplies a control signal to the base of transistor 116 which turns transistor 116 on harder so as to supply a current increased nominally by about 5% compared to the nominal charging current given in Table II. When control circuit 112 determines that no current should be supplied to the particular battery 12, control circuit 112 outputs opens to both control inputs 122 and 123 to supply a control signal to the base of transistor 116 which turns it off.

Each constant current circuit 114 may optionally include an LED 130 (shown in broken lines in FIGS. 6 and 7) in series with the collector/emitter of transistor 116 which is lighted whenever the particular battery 12 is receiving charging or test current.

Constant current circuit 114 supplies constant current to a battery 12 being charged as follows. With a low input to either or control input 122 or 123 by control circuit 112, transistor 116 is turned on and supplies current to a battery 12. The +5 volt output of regulator 104 is divided among resistance 118, the collector-emitter circuit of transistor 116, and battery 12. As the voltage across battery 12 (battery voltage) changes, the voltage across the emitter-collector of transistor 116 changes in the opposite direction so as to maintain the voltage across resistance 118 constant, thereby maintaining the current through resistance 118 constant which is supplied to battery 12 through transistor 116. Inclusion of an LED 130 between transistor 116 and battery 12 does not affect constant current operation since the voltage across LED 130 will remain constant because the current passed through LED 130 remains constant.

Referring to FIGS. 5 and 6, control circuit 112 includes timing means for measuring time, and receives a signal corresponding to the battery voltage on input 140 through resistor 142 (FIG. 6), and in response to the signal on control input 140 and the timing means, causes opens and lows to be output to control inputs 122 and 123 to provide charging, test or no current to the respective batteries, and to light LEDs 30–32 as described below.

FIG. 6 depicts a logic implemented embodiment of one control circuit 112 for battery holder 15 according to the invention. The other three battery control circuits 112 in battery charger 10 for battery holders 16–18 are identical to control circuit 112. Therefore, the description below of control circuit 112 applies to the other three control circuits. In the embodiment depicted in FIGS. 5 and 6, each control circuit 112 controls the supply of current to the battery 12 in the battery holder for that control circuit completely independently of the other control circuits, monitors the battery 12 in the battery holder for that control circuit completely independently of the monitoring of any other batteries in the other battery holders, and controls lighting of the LEDS 30–32 completely independently of the lighting of LEDs 33–41.

FIG. 7 shows a computer-implemented version 10A of battery charger 10. In that embodiment, a single control circuit 112A is provided in the form of a microcontroller 250 which includes internal read only memory (ROM) and read/write or random access memory (RAM), four constant current circuits 114 supplied with current from regulator 104 and controlled by microcontroller 250, and an LED array 252 composed of LEDs 30–41 controlled by microcontroller 250.

Referring to FIG. 6, control circuit 112 for battery holder 15 comprises a 0.5 Hz clock 162, a reference voltage counter 164 for incrementing the reference voltage, a digital to analog (DAC) converter 165 for converting the digital count signal (Q2–Q9) in reference voltage counter 164 to an analog reference voltage (DACOUT), a comparator 166 for comparing the battery voltage (BATT) to the analog reference voltage (DACOUT), a comparator 167 for comparing the battery voltage (BATT) to a fixed reference voltage (VCOMP) for determining when a battery has been inserted into battery holder 15, a timing counter 170 for measuring predetermined times from clock pulses (TCLK) gated by AND gate 171 from clock 162, transistors 172 and 173 for controlling transistor 116 of constant current circuit 114, transistors 175, 176 and 177 for driving LEDs 30, 31 and 32 respectively, and various logic circuits whose functions are described below.

As long as the AC power plug (not shown) for battery charger 10 is plugged into the AC line, AC power is supplied to transformer 102 (FIG. 5), and regulator 104 outputs regulated +5 volts DC. With +5 volts being output by regulator 104 and no battery in battery holder 15, RESET (FIG. 6) is generated at the output of comparator 167 when BATT (the battery voltage) on input 140 from constant current circuit 114 is higher than the 2.5 V fixed reference voltage VCOMP which are input to and compared by comparator 167. The RESET signal (high) resets or causes to be reset the counters and flip-flops in control circuit 112. RESET (high) is generated each time a battery 12 is removed from battery holder 15, and is maintained until a battery is re-inserted into battery holder 15. When a battery is inserted into battery holder 15, RESET goes low and control circuit 112 is reset to start without any prior charging history. Besides resetting control circuit 112 to commence charging a different battery, RESET may be used to re-check the status of a battery. For example, if battery charger 10 indicates that a battery 12 is charged (or not rechargeable), it may be removed to generate a RESET (high) and then replaced, and battery charger 10 will determine anew the status of the battery and commence charging if the new status so indicates.

RESET is generated as follows. With no battery in the battery holder 15, BATT is greater than the 2.5 V VCOMP reference voltage, and the VMAX, TMAX, and BSTOP signals supplied as inputs to NOR gate 180 are all low, which drives the output of NOR gate 180 (CHGING) high, to turn on transistor 172. Current flowing through transistor 172 causes the voltage at the base of transistor 116 to drop, which causes base current to flow in transistor 116 to turn transistor 116 on and commence the supply of charging current to battery 12. As a result, with no battery in battery holder 15, the BATT signal supplied to comparator 167 increases to approximately 5 volts, which drives the RESET output of comparator 167 high.

RESET from comparator 167 is supplied to reference voltage counter 164 which keeps all of counter 164 outputs low, and thereby the reference voltage output DACOUT of DAC 165 is effectively at zero. The outputs of timing counter 170 are set low with the first TCLK clock pulse from AND gate 171 after RESET goes low as follows. A TCLK pulse is gated through AND gate 182 (as an UP pulse) to reference voltage counter 164. This causes a VSTEP pulse to be generated at the Q1 output of reference voltage counter 164 which is supplied to the reset input of timing counter 170. The DACOUT signal from DAC 165 is compared in comparator 166 with the BATT signal. Since DACOUT is low (effectively zero) and BATT is high (greater than 2.5 V), the signal at the output of comparator 166 (BATT>DAC) is high, which enables AND gate 182 to pass TCLK clock pulses to reference voltage counter 164 However, reference voltage counter 164 is prevented from counting by the high RESET. A high RESET signal also holds flip-flop 185 reset and the Q output (BTIME) thereof low, and holds flip-flop 186 reset and the Q output thereof (BSTOP) low. A low BSTOP with a low VMAX and a low TMAX input to NOR gate 180 causes the CHGING output of NOR gate 180 to go high and turn on transistor 172, as discussed above. A high RESET signal thereby effectively prevents timing functions and incrementing of the reference voltage counter 164 which are required during charging operation of control circuit 112.

When an N, AAA, AA, C or D battery 12 is electrically connected between contacts 48 and 50 of battery holder 15, BATT is no longer higher than VCOMP and comparator 167 causes RESET to go low. The series resistance 118 in constant current circuit 114 is set to the proper value for the particular battery 12 by the battery size determining arrangement 46 (FIG. 3) which switches various resistors in parallel according to the physical size of the battery. When RESET goes low, the $Q_1$–$Q_9$ outputs of reference voltage counter 164 are initially low as a result of the high RESET signal. DAC 165 is set up for 2.55 v full scale output, but will be low initially due to all of the $Q_1$–$Q_9$ outputs of reference voltage counter 164 being low, so that DACOUT is less than BATT, and the output (BATT>DAC) of comparator 166 is high. CHGING remains high and allows AND gate 171 to pass TCLK pulses to AND gate 182. Since comparator 166 has a high output BATT>DAC, it enables AND gate 182 to pass clock pulses (as UP pulses) to the clock input of reference voltage counter 164, to cause it to count up. VSTEP pulses output from the $Q_1$ output of reference voltage counter 164 are supplied to the reset input of timing counter 170 to reset it, as indicated above. The VSTEP signal output from $Q_1$ of reference voltage counter 164 alternates between high and low at one-half the rate of the TCLK pulses until reference voltage counter 164 has counted up to the point when DACOUT exceeds BATT, which takes approximately 15 minutes from the time a battery is placed into the battery holder 15, assuming a battery voltage of about 1.3 volts, the 0.5 Hz clock 162 and DACOUT is incremented in 0.01 volt steps at 0.01 volt per 8 seconds, as follows.

DAC 165 is set for 2.55 volts full scale for a 255 digital count of reference voltage counter 164 outputs $Q_2$–$Q_9$. Since DAC 165 is incremented every 8 seconds, it would take about 34 minutes for DAC 165 to provide a full scale 2.55 volt output. (However, DAC 165 is only permitted to reach 1.63 volts, as discussed below.) Thus, when BATT exceeds DACOUT, comparator 166 outputs a high BATT>DAC signal which enables AND gate 182 to clock UP pulses to reference voltage counter 164, which then causes DACOUT to increase in 0.01 volt increments as long as CHGING is high and BATT>DAC. During this time period, the reference voltage is simply incremented to the point where it exceeds the battery voltage, at which time the charging cycle begins. During this time after RESET goes low, charging current is being supplied to battery 10.

While reference voltage counter 164 is being incremented by UP clock pulses from AND gate 182, timing counter 170 is being incremented by TCLK clock pulses from AND gate 171, which occur every two seconds as long as charging current (CHGING high) is supplied to battery 12. The $Q_5$ output of timing counter 170 goes high once approximately every 33 seconds as long as VSTEP pulses from the $Q_1$ output of reference voltage counter 164 are farther apart than 33 seconds so as not to first reset timing counter 170. Similarly, the $Q_6$, $Q_7$, $Q_8$ and $Q_9$ outputs of timing counter 170 go high at 66 seconds, 132 seconds, 264 seconds and 528 seconds as long as VSTEP pulses are that far apart. Outputs $Q_5$–$Q_{12}$ of timing counter 170 are coupled as inputs to NOR gate 190. Whenever an output $Q_5$–$Q_{12}$ of timing counter 170 goes high, the output CTLOW of NOR gate 190 goes low.

Whenever TSETUP ($Q_9$ output of timing counter 170) goes high (approximately 9.5 minutes from the last VSTEP), it latches flip-flop 185 to set the Q output (BTIME) high. When TSETUP goes high, the output CTLOW of NOR gate 190 goes low, then on the next increment of reference voltage counter 164, output $Q_1$ will have caused VSTEP to go high, resettling timing counter 170 and causing CTLOW to go high and remain high until the $Q_5$ output of timing counter 170 goes high (up to about 33 seconds following a VSTEP pulse). With CTLOW high, BTEST high and CHGING high, all supplied as inputs to AND gate 192, the output BTEST of AND gate 180 goes high to turn transistor 173 on (BTEST). This turns transistor 116 on harder to pass about 5% more current (referred to herein as the test current) to battery 12 and commence a current test, which is maintained until either the $Q_5$ output of timing counter 170 goes high (about 33 seconds) or the battery voltage (BATT) rises by 0.01 volt. When $Q_5$ of timing counter 170 goes high, it drives CTLOW low (output of NOR gate 202), which drives BTEST (output of AND gate 192) low, to turn transistor 123 off and return transistor 116 to the normal charging condition. If, however, BATT exceeds DACOUT (inputs to comparator 166) before $Q_5$ of timing counter 170 goes high, comparator 166 outputs a high BATT>DAC which enables AND gate 182 and allows a clock pulse UP to increment reference voltage counter 164. This causes the $Q_1$ output (VSTEP) of reference voltage counter 164 to go high to set flip-flop 186 and cause the Q output (BSTOP) thereof to go high, which is supplied to NOR gate 180 and causes the output (CHGING) thereof to go low. This means that the battery voltage has increased by more than a predetermined amount during the predetermined testing time period. A low CHGING signal turns transistor 172 off, which causes control input 122 to go high and turn transistor 116 off and terminate the supply of current to battery 12. When BSTOP goes high, it turns transistor 177 on to light red diode 32. As long as BSTOP is high, transistor 116 is off, no charging current is supplied to battery 12 while it remains in the battery holder. This is an end of charge condition indicating that sufficient current has been supplied to the battery for a long enough time to prepare the battery for reuse.

The $Q_1$, $Q_3$, $Q_7$ and $Q_9$ outputs of reference voltage counter 164 are provided as inputs to AND gate 194. When $Q_1$, $Q_3$, $Q_7$ and $Q_9$ of reference voltage counter 164 go high at a count of 1.63, the output (VMAX) of AND gate 194 goes high. This drives the output of NOR gate 180 low, to turn off transistors 172 and 116 and terminate the supply of charging current to battery 12. A count of 1.63 at the output of reference voltage counter 164 corresponds to a reference voltage of 1.63 volts at the output (DACOUT) of DAC 166. A high VMAX also turns transistor 175 on to light yellow LED 30, which indicates that charging has stopped due to reaching an upper voltage limit.

If VMAX goes high before BTIME (Q output of flip-flop 185) is latched, the NOT BTIME (Q NOT output of flip-flop 185) and VMAX signals to AND gate 196 drive the DSET output of AND gate 196 high to set flip-flop 186, which also causes the red LED 32 to be lighted together with the yellow LED 30. This indicates that the 1.63 volt level was crossed at a slope of greater than 0.01 volt in 9½ minutes. Normally the battery voltage slope will drop off well before reaching 1.63 volts. A high slope indicates a battery 12 that is literally "dried up", or possibly a very fresh battery that was attempted to be charged twice in quick succession.

The normal stopping point for charging a battery in its long "middle age" is then continued, i.e., charging current is supplied to battery 12 (CHGING and transistor 172 on). Charging is terminated if one of the conditions described above occurs, or if the battery voltage does not increase much in a long period of time. Charging will be terminated if the VSTEP pulses ($Q_1$ output of reference voltage counter 164) exceed 1 hour 10 minutes spacing, which causes the $Q_{12}$ output (TIMEOUT) of timing counter 170 to go high. The TIMEOUT output ($Q_{12}$) of timing counter 170 and the BTIME output of flip-flop 185 are supplied as inputs to AND gate 198.

When both TIMEOUT and BTEST are high, the output TMAX of AND gate 214 goes high, which turns on transistor 176 and lights green LED 31. This indicates that charging has stopped because a long application of charging current has not resulted in a battery voltage increase (which includes the possibility that the voltage may actually have decreased somewhat.

Control circuit 112 upon insertion of a battery in holder 115 supplies current to battery 12 while waiting for the reference voltage to be incremented to exceed the initial battery voltage, at which time a charging cycle begins. Whenever the battery voltage increases to exceed the reference voltage, a BTEST is conducted provided that the BTIME output of flip-flop 185 has been set high. Control circuit 112 terminates charging when specified conditions in terms of battery voltages, time and reference voltages are satisfied, as discussed above, for example when a maximum voltage is reached, or when the battery voltage increases by a predetermined amount during the predetermined testing (BTEST) time period, or if during normal charging, the battery voltage does not increase by a predetermined amount within a predetermined charging test period.

Referring now to FIG. 7, a computer implemented embodiment of battery control circuit 112A for a battery charger 10A is shown. Control circuit 112A controls four constant current circuits 114 which may be identical to or substantially the same as constant current charging circuits 114 of battery charging circuit 110. Control circuit 112A is embodied by a microcontroller 250. Like battery charger 10, battery charger 10A includes four separate constant current circuits 114, so that charging and testing of each battery 12 in a holder 15–18 is essentially independent of the charging and testing of any other battery 12 held in any other battery holder 15–18. However, because each constant current circuit 114 shares a common control circuit 112A, monitoring the batteries 12 held by the battery holders is done on a sequential or time shared basis, while control of the constant current circuits 114 is done on a parallel output basis whereby chargers and test currents may be maintained continuously or individual circuits may be turned on or off on command. Since microcontroller 250 operates at a much higher speed than the basic 0.5 Hz rate at which battery charger 10 operates, battery charger 10A operates with essentially the same performance (or better due to higher operating speed) as battery charger 10.

Constant current circuits 114 in battery charger 10A operate from the +5 volt output of regulator 104 (FIG. 5) the same as described for constant current circuits 114 in battery charger 10. Microcontroller 250 outputs control signals on control inputs 122 and 123 and receives the BATT signal on input 140, as do the control circuits 112 of battery charger 10. Microcontroller 250 controls LEDs 30–41 by means of output control signals PA4, 5 and 6 comparable to CHGING (yellow LED), BSTOP, TMAX or VMAX (green LED) and BSTOP (red LED) output by control circuits 112 for one set of LEDs, but uses the same three PA 4, 5 and 6 control lines and four sink lines PA0–PA3 of microcontroller 250 as address lines to address each set 30–32, 33–35, 36–38 and 39–41 of LEDs. The LEDs are refreshed often enough to avoid flicker.

Microcontroller 250 includes internal circuitry for a clock (not shown) whose frequency is set by crystal 254, an internal analog to digital convertor (ADC), a CPU, internal registers, and internal ROM and RAM. Microcontroller 250 may be SGS-Thomson Microelectronics model ST6215. Other suitable microcontrollers, microcomputers, microprocessors plus any needed external components such as an ADC, ROM, etc., may be used.

For the SGS-Thomson microcontroller, which is illustrated in FIG. 7, PA0–PA3 are sink inputs of port A; PA4–PA7 are programmable analog input/outputs (I/O) functioning as analog outputs of port A; PB0–PB7 are programmable analog I/Os functioning as inputs of port B and PC4–PC7 are programmable analog I/Os functioning as inputs of port C. In control circuit 112 of FIG. 6, DAC 165 has a maximum input count of 2561175. In order to reach 2.56 volts, a step increment of 0.01 volt was selected. However other step increments may have been used, as indicated above. The voltage step size of the internal ADC of microcontroller 250 is given by the maximum magnitude of the reference voltage supplied to microcontroller 250 (from 2.56 to 5.0 volts) divided by 256 steps. This means that the size of the step may be selected from 0.01 volt to 0.195 volts.

Figure 8A:
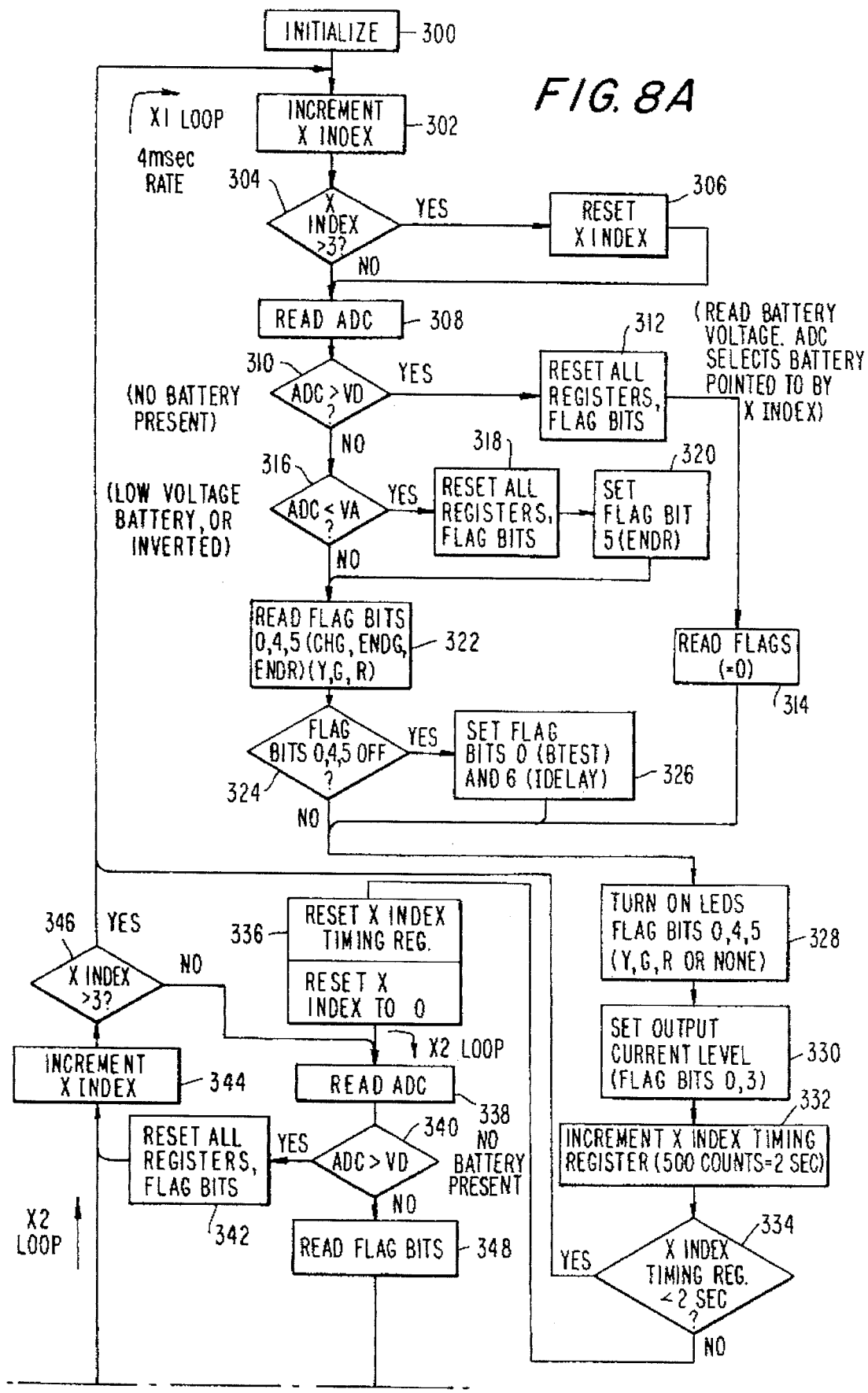
FIGS. 8A and 8B are a flow chart illustrating operation of the battery charger depicted in FIG. 7.
Figure 8B:
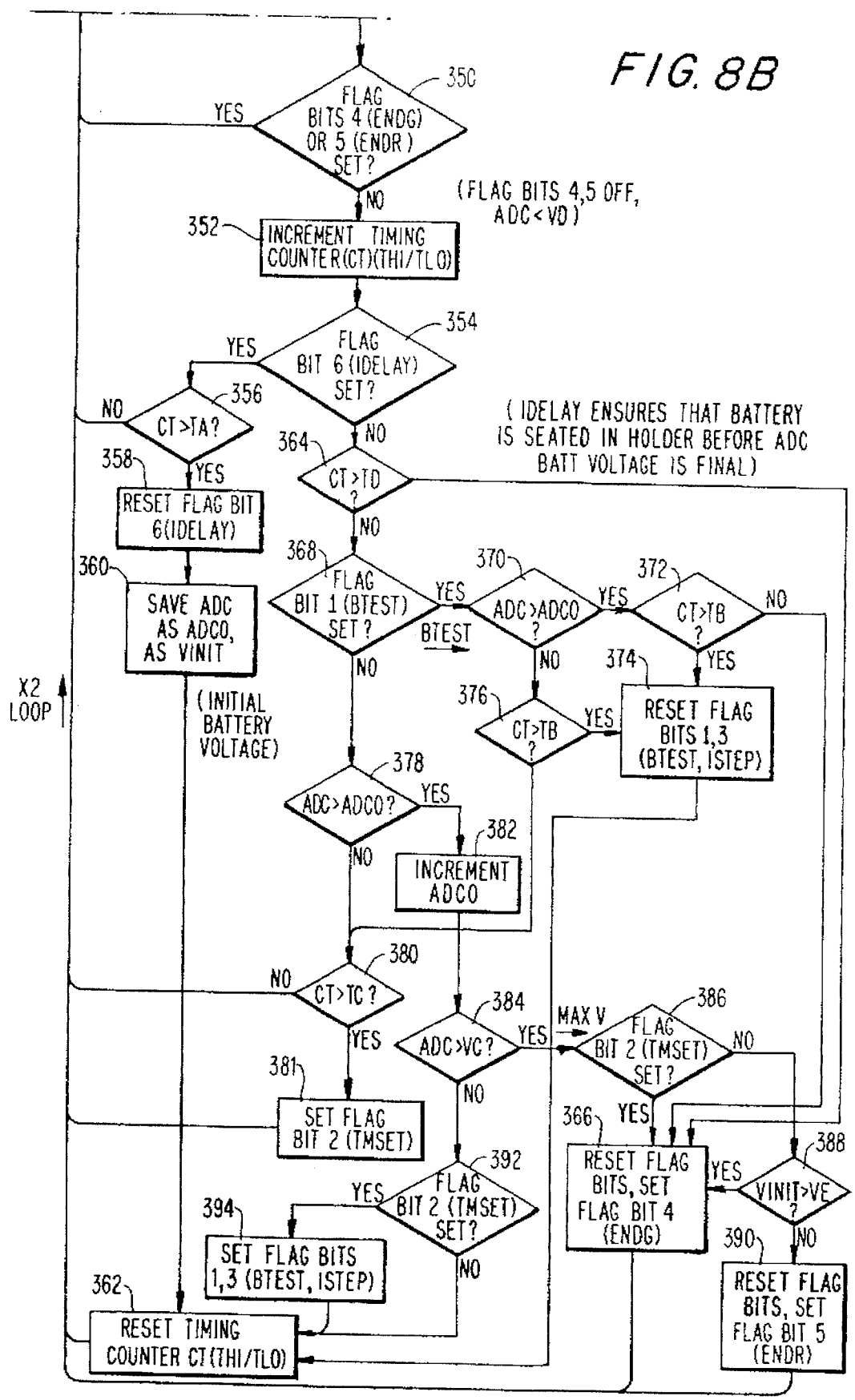

Microcontroller 250 operates to control constant current circuits 114 and to monitor batteries 12 held by battery charger 10A as illustrated by the flow chart depicted in FIGS. 8A and 8B.

Referring to FIG. 8A, upon applying power to microcontroller 250, an initialization step 300 is carried out, after which in step 302 the X index is incremented to cause microcontroller 250 to prepare to monitor the constant current circuit 114 for the battery held in the first battery holder 15 (or in the next battery holder 15–18 depending on the X index if the incrementing step 302 is performed from the X1 loop). The flow chart of FIGS. 8A and 8B illustration operation of a battery charger 10A which has four battery holders 15–18 for charging four batteries 12. An X index (0, 1, 2 and 3) causes microcontroller 250 to process the four constant current circuits 114 for battery holders 15–18, respectively, while continuously and simultaneously supplying current to the constant current circuits 114 when called for. Therefore, in step 304 microcontroller 250 checks to see whether microcontroller 250 was last monitoring the "3" X index for battery holder 18, and if so (index>3), resets the X index in step 306. In step 308, microcontroller 250 reads the internal analog to digital converter (ADC) output for the particular battery 12 being monitored. If in step 310 the ADC output (which corresponds to the analog BATT voltage in control circuit 112) is greater than a maximum reference voltage VD of 2.5 v (which corresponds to the fixed reference voltage VCOMP in battery charging circuit 110), then no battery is being held by the particular battery holder 15–18 being monitored, and microcontroller 250 resets all registers and FLAG bits in step 312, then reads the FLAGS in step 314 (all zero) and jumps to step 328. Table III below defines an 8-bit FLAG word.

TABLE III

| BIT NO. | 0 | 1 | 2 | 3 | 4 | 5 | 6 | 7 |
|---|---|---|---|---|---|---|---|---|
| FUNCTION | CHG | BTEST | TMSET | ISTEP | ENDG | ENDR | IDELAY | (SPARE) |

The CHG flag gives the status of control line 122 which when high (set) indicates that charging current is being supplied to a particular battery. The BTEST gives the status of control line 123 which when high (set) indicates that test current is being supplied to a particular battery. ISTEP controls the supply of current during a BTEST to a battery being charged. TMSET gives the status of a timing counter (CT) count for the maximum predetermined time allowed between predetermined increments of a battery under charge before charging will be terminated, and corresponds to BTIME in control circuit 112 (FIG. 6). ENDG gives the status when charging is complete and the battery is usable; it combines indications in each set of LEDs 30–32, 33–35, 36–38 and 39–41 of battery charger 10. ENDR gives the status when charging is terminated but the battery is of questionable use; it replaces the condition when the yellow and red LEDs (30 and 32 in FIG. 6) were turned on simultaneously. ENDR also indicates another condition not implemented in battery charger 10, that is, it indicates a battery having too low initial terminal voltage which is probably not rechargeable, or if a battery is placed inverted into a holder. IDELAY gives the status of the count of the timing counter (CT) count for the settling time, which prevents determining and indicating the charge status of a battery for a short period of time while a user inserts and seats a battery.

If the step 310, ADC does not exceed the fixed reference/voltage VD, which means that a battery is not in the battery holder, VD being, for example, 2.5 V similar to VCOMP in FIG. 6, then microcontroller 250 in step 316 determines whether ADC is less than a minimum reference voltage VA of about 0.85 volt. If yes, meaning that the battery voltage is too low to be recharged, or if it was inserted inverted into the particular battery holder, all registers and flag bits are reset in step 318, and flag bit 5, ENDR, is set, which lights the red LED for the particular battery holder. Referring to FIG. 7, an LED is lighted by microcontroller 250 by driving the one of outputs PA4, PA5 or PA6 high, and the one of the address (sink) inputs PA0, PA1, PA2 or PA3 low to address the LED which is to be lighted. As mentioned, the LEDs are driven at a high enough refresh rate that they do not appear to flicker.

Referring again to FIG. 8A, after setting flag ENDR and the appropriate red LED in step 320, microcontroller 250 in step 324 reads FLAG bits 0(CHG), 4(ENDG) and 5(ENDR). If FLAG bits 0, 4 and 5 are not set (off or low), as determined in step 324, then microcontroller 250 sets FLAG bits 0(CHG) and 6(IDELAY) high. In step 328, microcontroller 200 turns on the yellow, green or red LED, or no LED, corresponding to which, if any, of FLAG bits 0, 4 and 5 is set from previous steps. In step 330, the current to the battery 12 in the particular battery holder 15–18 being monitored is set either to the charging current (CHG bit 0 set, control line 122 low), or to the test current (ISTEP bit 3 set, control line 123 low). In step 332, a timing counter register (implemented in RAM) is incremented, which has a capacity of 500 counts for 2 seconds. If in step 334, the count in the timing counter is less than 2 seconds, then the program returns to step 302 which increments the X index and microcontroller 250 monitors the battery 12 in the next battery holder 15–18. The time for one passage around the X loop is set to be about 4 ms by suitable time delays and interrupts utilized within the loop. The X1 loop is left temporarily whenever the count in the timing counter is greater than two seconds (step 334). The X1 loop sets up a two second set-up time in which all battery holders 15–18 are monitored, flags read and set, etc. If in step 334 the X index timer is greater than or equal two seconds, then in step 336 the X index timer is reset and the X index is set to 0.

Battery monitoring now continues in an X2 loop starting from battery holder 15 (X index 0). In step 338 the ADC (battery voltage) is read, and in step 340, microcontroller 250 determines if ADC (current battery voltage) is greater than the fixed VD reference voltage of 2.5 volts. If yes, meaning that there is no battery in the battery holder 15, the flags and registers are reset in step 342 and the X index is incremented to battery holder 16 in step 334. Step 346 will determine whether the X index is less than 3, and if so cause the program to start in the X2 loop, step 302. If the X index is not less than 3, the ADC is read in step 338 and step 340 determines if the ADC is greater than the fixed reference voltage, VD (2.5 volts). If in step 340 ADC is not greater than VD, meaning that a battery 12 is in holder 15, then step 348 reads the FLAG bits. If in step 350 (FIG. 8B), FLAG bit 4(ENDG) or FLAG bit 5(ENDR) is set, meaning that charging has terminated for the battery in the particular holder with a red or green LED turned ON, then the program jumps back to step 344 (FIG. 8A). If however, FLAG bits 4 and 5 are off (step 350, FIG. 8A), which means that there is a battery in battery holder 15 and it is under charge, then in step 352 the timing counter (CT) is incremented. In step 354 (FIG. 8B), if FLAG bit 6 (IDELAY) is set, meaning that a predetermined settling time of about 15 seconds since a battery was inserted into the particular battery holder has not elapsed, then in step 356 the count in the timing counter (CT) is compared to a fixed settling time TA of about 15 seconds, and if less than the minimum settling time TA has not elapsed, the program increments the X index and moves to the next X increment in the X2 loop at step 344 (FIG. 8A). If CT is greater than TA (step 356), which indicates that the settling time TA has elapsed, than FLAG 6 (IDELAY) is reset in step 358, the initial ADC battery voltage is saved as ADCO (last battery voltage) and VINIT (initial battery voltage) in step 360, the timing counter (CT) is reset in step 362 and the program increments X index in step 344 (FIG. 8A) and remains in the X2 loop.

If in step 354 FLAG bit 6 (IDELAY) was not set, meaning that the settling period had expired and FLAG bit 6 was reset per steps 356–362, then the timing counter (CT) count is compared to a maximum charging time period TD of about 4200 seconds (one hour, ten minutes). This maximum time period corresponds to timing counter 170 output $Q_{12}$ (FIG. 6) in control circuit 112, and indicates that charging current has been supplied to the battery for the maximum TD time without the ADC (battery) voltage rising by a predetermined amount (0.01 volt). That means that the battery has been successfully charged. Then the FLAG bits are reset, FLAG bit 4 (ENDG) is set, indicating a charged battery, the green LED for that battery holder is lit, and charging current to the battery in the particular holder is terminated (FLAG bit 0 reset).

If in step 364 the count of the timing counter (CT) is not greater than the maximum time TD, then charging continues. If in step 368 FLAG bit 1 (BTEST) is set (on), the program branches to step 370. If in step 370 the current battery voltage (ADC) is greater than the previous saved battery voltage (ADCO) by the predetermined amount, the program branches to branch to step 372. If in step 372 CT is greater than TB of about 33 seconds, then in step 374, FLAG bits 1 (BTEST) and 3 (ISTEP) are reset (turned off). This causes outputs PB0, PB2, PB4, or PB6 to go open terminating the test current increase. The program proceeds to step 362 in which the timing counter (CT) count, which is stored in two bytes, THI for most significant bits and TLO for least significant bits, is reset to zero, and the X index increment in step 344 (FIG. 8A).

If in step 370 the current battery voltage (ADC) is not greater than the previous saved battery voltage (ADCO), the program branches to step 376. If in step 376 the timing count (CT) count is greater than the BTEST time delay period TB, then in step 374 FLAG bits 1 (BTEST) and 3 (ISTEP) are reset to zero to end the BTEST and turn off the test current by making PB0, 2,4 and 6 go to open, and CT is reset to zero in step 362.

If in step 376, CT is not greater than TB, indicating that it is not time for the BTEST to end, the program branches to step 380. If in step 380 the timing counter (CT) count is greater than the TSETUP time TC (corresponding to $Q_9$ output of timing counter 170 in FIG. 6) which is the time for monitoring whether the battery voltage changed by a predetermined step, then in step 381 FLAG bit 2 (TMSET) is set, and the program returns to the X2 loop. (step 344 in FIG. 8A).

If in step 368 FLAG 1 bit (BTEST) was not set, and in step 378 the current battery voltage (ADC) was greater than the previous saved battery voltage ADCO, meaning that the battery voltage increased by the predetermined amount within a BTEST time period, then the program branches to step 382, where previous battery voltage (ADCO), which corresponds to the reference voltage DAC in charging circuit 110, and the current battery voltage are saved (incremented). If in step 384 the current battery voltage is greater than the maximum battery voltage VC (1.63 volts), the program branches to step 386. If in step 386 FLAG bit 2 (TMSET) is not set, meaning the TSETUP time has never been exceeded, then the program branches to step 388. If in step 388 the initial battery voltage (VINIT) was less than or equal to 1.35 volts (VE) (unsatisfactory condition), then in step 390 the FLAG bits are reset and FLAG bit 5 (ENDR) is set. However, if VE>1.35 v in step 386, then FLAG bit 4 (ENDG) is set in step 366 and the green LED is lighted to indicate a nearly new battery.

In step 384, if the current battery voltage ADC is not greater that the maximum predetermined voltage VC (1.63 volts) and if in step 392 FLAG bit 2 TMSET is set, then FLAG bits 1 and 3 are then the program branches to step 392, set meaning that a BTEST may be done at any increment of the ADCO once TIMESET is set on. TIMESET is not turned off until step 366 or 390 when charging ends, or it possibly could be turned off in the X1 loop by removing the battery. When the BTEST control signal is on, and most particularly ISTEP, this signal appears as a low on the appropriate PB0, PB2, P4 or PB6 line to cause test current to be supplied to the appropriate battery. Thereafter, and if in step 392 FLAG bit 2 (TMSET) was not set, the THI and THO times in timing counter (CT) are reset, and the X2 loop entered.

While the invention has been described and illustrated in connection with preferred embodiments, many variations and modifications as will be evident to those skilled in this art may be made without departing from the spirit and scope of the invention. The invention as set forth in the appended claims is thus not to be limited to the precise details of construction set for the above and such variations and modifications are intended to be included within the scope of the invention.

What is claimed is:

1. A battery charger particularly but not exclusively for charging alkaline batteries, comprising:

controlled means for supplying substantially constant charging current from a power source to a battery under charge or terminating the supply of charging current to the battery;

controlling means for controlling said controlled means, said controlling means including means for providing an adjustable reference voltage, said controlling means causing said controlled means to:

supply said substantially constant charging current to the battery while causing said reference voltage means to provide said reference voltage which is greater than a battery voltage available at terminals of the battery, and to thereafter provide, as the battery voltage increases, increased reference voltages, up to a predetermined maximum reference voltage, which exceed the battery voltage and which exceed a previous reference voltage; and terminate the supply of charging current to the battery upon the occurrence of a condition based upon a relationship of the reference voltage and the battery voltage, or a relationship of the reference voltage, the battery voltage and time.

2. The battery charger of claim 1 wherein said condition for terminating the supply of charging current to the battery is when the battery voltage does not increase during charging to be greater than a first or a subsequent reference voltage during a predetermined charging time period.

3. A battery charger particularly but not exclusively for charging alkaline batteries, comprising:

controlled means for supplying substantially constant charging current from a power source to a battery under charge or terminating the supply of current to the battery;

controlling means for controlling said controlled means, said controlling means including means for providing an adjustable reference voltage, said controlling means causing said controlled means to:

supply said substantially constant charging current to the battery while causing said reference voltage means to provide said reference voltage which is greater than a battery voltage available at terminals of the battery, and to thereafter provide, as the battery voltage increases, increased reference voltages, up to a predetermined maximum reference voltage, which exceed the battery voltage and which exceed a previous reference voltage; and terminate the supply of charging current to the battery when said reference voltage means provides the predetermined maximum reference voltage, or when the battery voltage does not increase during charging to be greater than a first or a subsequent reference voltage during a predetermined charging time period.

4. A battery charger particularly but not exclusively for charging alkaline batteries, comprising:

controlled means for supplying a substantially constant but adjustable charging current from a power source to a battery under charge or terminating the supply of current to the battery;

controlling means for controlling said controlled means to cause said controlled means to supply said substantially constant charging current to the battery as a battery voltage available at terminals of the battery changes during charging of the battery, from time to time during a testing period cause said controlled means to supply a substantially constant test current to the battery which exceeds the charging current by from about 2.5% to about 25%, and to cause said controlled means to terminate the supply of current to the battery when said controlled means is providing said charging current to the battery and the battery voltage reaches a predetermined maximum voltage, or when said controlled means is supplying said test current to the battery and the battery voltage increases by greater than a predetermined amount within a respective testing period.

5. A battery charger particularly but not exclusively for charging alkaline batteries, comprising:

controlled means for supplying a substantially constant but adjustable charging current from a power source to a battery under charge or terminating the supply of current to the battery;

controlling means for controlling said controlled means, said controlling means including means for providing an adjustable reference voltage, said controlling means causing said controlled means to:

supply said substantially constant charging current to the battery while causing said reference voltage means to provide said reference voltage which is greater than a battery voltage available at terminals of the battery, and to thereafter provide, as the battery voltage increases, increased reference voltages, up to a predetermined maximum voltage, which exceed the battery voltage and which exceed a previous reference voltage within a predetermined charging time period after a first or a subsequent reference voltage is provided;

from time to time during a testing period supply a substantially constant test current to the battery which exceeds the charging current by from about 2.5% to about 25%; and terminate the supply of current to the battery when said reference voltage means provides the predetermined maximum voltage, or when the battery voltage increases by greater than a predetermined amount during a respective testing period when test current is being supplied to the battery, or when the battery voltage does not increase during charging to be greater than a first or a subsequent reference voltage during any predetermined charging time period.

6. The battery charger according to claim 4 or 5 wherein said controlling means causes said controlled means to resume the supply of charging current to the battery after the testing period when said controlling means does not cause said controlled means to terminate the supply of current to the battery.

7. The battery charger of claim 3 or 5 wherein said controlling means causes said reference voltage means to increase the reference voltage in discrete increments.

8. The battery charger of claim 3 or 5 wherein said battery charger is configured to charge batteries rated at about 1.25 volts to about 1.5 volts, and wherein said controlling means causes said reference voltage means to increase the reference voltage by a fixed amount of from about 0.005 volt to about 0.05 volt.

9. The battery charger of claim 3 or 5 wherein said battery charger is configured to charge batteries rated at about 1.25 volts to about 1.5 volts, and wherein said controlling means causes said controlled means to supply said constant charging current of between about 0.28 ma and about 1.5 ma per gram weight of the battery, and wherein said controlling means causes said reference voltage means to increase the reference voltage by a fixed amount of about 0.01 volt.

10. The battery charger of claim 3, 4 or 5 wherein said battery charger is configured to charge batteries rated at about 1.25 volts to about 1.5 volts, and wherein said reference voltage means is configured to provide said predetermined maximum reference voltage of about 1.6 volts.

11. The battery charger of claim 3 or 5 wherein said battery charger is configured to charge batteries rated at about 1.25 volts to about 1.5 volts, and wherein said controlling means causes said controlled means to supply said constant charging current of between about 0.28 ma and about 1.5 ma per gram weight of the battery, and wherein said predetermined charging time period is from about 45 minutes to about 2 hours.

12. The battery charger of claim 4 or 5 wherein said battery charger is configured to charge batteries rated at about 1.25 volts to about 1.5 volts, and wherein said controlling means causes said controlled means to supply said constant charging current of between about 0.28 ma and about 1.5 ma per gram weight of the battery, and wherein said testing period is from about 10 seconds to about 60 seconds in duration.

13. The battery charger of claim 4 or 5 wherein said controlling means causes said controlled means to supply the testing current a predetermined time after an increase of the reference voltage.

14. The battery charger of claim 3, 4 or 5 wherein said controlled means comprises a valve element coupled to the power source and the battery such that when said controlled means is supplying said charging current, said charging current is maintained substantially constant by action of said valve element as the battery voltage changes.

15. The battery charger of claim 14 wherein said controlling means causes a control signal of a first value to be supplied to said valve element when causing said controlled means to provide said charging current, and causes a control signal of a second value to be supplied to said valve element when causing said controlled means to terminate the supply of current to the battery.

16. The battery charger of claim 15 wherein said controlled means comprises a resistive element coupled in series between the power source and the battery, said valve element and said resistive element being coupled such that when said controlled means is supplying said charging current to the battery the voltage across said resistive element is maintained substantially constant by action of said valve element as the battery voltage changes.

17. The battery charger of claim 16 wherein said valve element has a control input, an input and an output and passes current between said input and said output in dependence upon said first and second value control signals caused to be supplied to said control input by said controlling means, said input and said output being coupled in series with said resistive element between said power source and said battery.

18. The battery charger of claim 17 wherein said controlling means provides first and second control signals on first and second outputs thereof, and wherein said controlled means in response to said first and second control signals provides said first and second value control signals, respectively, to said control input of said valve element.

19. The battery charger of claim 18 wherein said valve element comprises a transistor device and said controlled means comprises a circuit coupling said first and second control signals on said first and second outputs of said controlling means to said control input of said transistor device.

20. The battery charger of claim 4 or 5 wherein said controlled means comprises a valve element coupled to the power source and the battery such that when said controlled means is supplying said charging current, said charging current is maintained substantially constant by action of said valve element as the battery voltage changes, and when said controlled means is supplying said test current, said test current is maintained substantially constant by action of said valve element as the battery voltage changes.

21. The battery charger of claim 20 wherein said controlling means causes a control signal of a first value to be supplied to said valve element when causing said controlled means to provide said charging current, causes a control signal of a second value to be provided to said valve element when causing said controlled means to supply said test current, and causes a control signal of a third value to be supplied to said valve element when said controlled means terminates the supply of current to the battery.

22. The battery charger of claim 20 wherein said controlled means comprises a resistive element coupled in series between the source of direct current and the battery, said valve element and said resistive element being coupled such that when said controlled means is supplying said charging current or said test current to the battery the voltage across said resistive element is maintained substantially constant by action of said valve element as the battery voltage changes.

23. The battery charger of claim 22 wherein said valve element has a control input, an input and an output and passes current between said input and said output in dependence upon said first, second and third value control signals caused to be supplied to said control input by said controlling means, said input and said output being coupled in series with said resistive element between said power source and said battery.

24. The battery charger of claim 23 wherein said controlling means provides first and second control signals on first and second outputs thereof, and wherein said controlled means in response to said first and second control signals provides said first and second value control signals, respectively, to said control input of said valve element, and in response to an absence of both of said first and second control signals provides said third value control signal to said control input.

25. The battery charger of claim 24 wherein said valve element comprises a transistor device and said controlled means comprises a circuit coupling said first and second control signals on said first and second outputs of said controlling means to said control input of said transistor device.

26. The battery charger of claim 16 wherein said controlled means is coupled to a power source having a substantially constant voltage which is greater than the battery voltage when the battery is substantially fully charged.

27. The battery charger of claim 22 wherein said controlled means is coupled to a source having a substantially constant voltage which is greater than the battery voltage when the battery is substantially fully charged.

28. A battery charger for charging at least one battery which may be any of a plurality of different sizes, particularly but not exclusively for charging alkaline batteries, comprising:

at least one circuit coupled to a power source;

a holder associated with each said circuit for holding therein a single battery of any of said sizes, each said holder including contacts for electrically connecting to a battery held therein, each said circuit supplying current to the battery held in the associated holder through the contacts thereof;

controlling means for monitoring a battery voltage available at terminals of each battery held in a respective holder, and in response thereto, controlling the charging of a respective battery in a respective holder, each said circuit being responsive to said controlling means to supply charging current to a respective battery and terminate supply of charging current to a respective battery;

each said holder including a movable element whose position is determined by the physical size of a battery held in the holder, each said movable element being coupled to a respective circuit so as to cause the respective circuit to automatically supply a predetermined charging current to a respective battery which is different for batteries of at least two different sizes in response to the position of the movable element.

29. The battery charger of claim 28 wherein said battery charger is constructed to charge a plurality of batteries of the same or different size at the same time, and includes a plurality of circuits, each with a single associated holder, said controlling means controlling charging of each battery held by a holder.

30. The battery charger of claim 28 wherein said contacts of each holder comprise a contact carried by the respective movable element.

31. The battery charger of claim 28 wherein said battery charger includes separate controlling means for each said circuit.

32. The battery charger of claim 28 wherein each said circuit comprises resistance coupled in a respective circuit such that the value thereof affects the value of the charging current supplied by a respective circuit to a battery held in the associated holder, the movable element of a respective holder being coupled to a respective circuit such that in at least two positions of a respective movable element the resistance of a respective circuit is different, whereby a respective circuit can supply charging current of at least two different values depending upon the position of the respective movable element which is determined by the physical size of the battery held in the respective holder.

33. The battery charger of claim 32 wherein said resistance is coupled in series with a respective circuit and at least one of the contacts.

34. The battery charger of claim 28 wherein each said circuit comprises a valve element coupled to a respective battery such that the charging current supplied by the respective circuit is maintained substantially constant at the value set by said circuit under control of said controlling means by action of said valve element as the battery voltage of the respective battery changes.

35. The battery charger of claim 32 wherein each said circuit comprises a valve element coupled to a respective battery such that the charging current supplied by the respective circuit is maintained substantially constant at the value set by said circuit under control of said controlling means by action of said valve element as the battery voltage of the respective battery changes and wherein each said resistance is coupled in series with a respective valve and at least one of the respective contacts.

36. A method for charging a battery, particularly but not exclusively an alkaline battery, comprising:

supplying a substantially constant current to the battery; and providing a variable reference voltage including providing a reference voltage which is greater than a battery voltage available at terminals of the battery under charge, thereafter increasing the reference voltage up to a predetermined maximum voltage when the battery voltage rises above the reference voltage within a predetermined charging time period, and terminating the supply of current to the battery when the battery voltage does not rise above a first or a subsequent reference voltage within the predetermined charging time period or when the reference voltage reaches the predetermined maximum voltage.

37. The method of claim 36 wherein the reference voltage is increased by discrete amounts up to the predetermined maximum reference voltage each time that the battery voltage rises above the reference voltage within the predetermined charging time period.

38. A method for charging and determining the charge state of a battery, particularly but not exclusively an alkaline battery, comprising:

supplying a substantially constant charging current to the battery as a battery voltage available at terminals of the battery changes during charging of the battery, and monitoring the voltage of the battery;

from time to time increasing the charging current being supplied to the battery by from about 2.5% to about 25% for up to a predetermined testing time period, and maintaining the increased charging current substantially constant during the predetermined testing time period;

terminating the supply of current to the battery when the battery voltage increases by a predetermined amount within the predetermined testing time period while the increased, substantially constant charging current is being supplied to the battery.

39. The method of claim 38 including the step of terminating supply of current to the battery when the battery voltage reaches a predetermined voltage.

40. The method of claim 38 including the steps of providing a variable reference voltage including providing a reference voltage which is greater than the battery voltage, thereafter increasing the reference voltage up to a predetermined maximum voltage when the battery voltage rises above the reference voltage within a predetermined charging time period, and terminating the supply of current to the battery when the battery voltage does not rise above the reference voltage within the predetermined charging time period or when the reference voltage reaches the predetermined maximum reference voltage.

41. The method of claim 40 wherein the charging current is increased a predetermined time after an increase of the reference voltage.

42. The method of claim 40 wherein the reference voltage is increased by discrete amounts up to the maximum reference voltage each time that the battery voltage rises above the reference voltage within the predetermined charging time period.

43. A method for charging batteries of N, AAA, AA, C and D sizes, comprising:

supplying a substantially constant charging current of between about 0.28 ma and about 1.5 ma per gram weight of the battery to the battery being charged; and providing a variable reference voltage including providing a reference voltage which is greater than a battery voltage available at terminals of the battery under charge, thereafter increasing the reference voltage, up to a maximum voltage of about 1.6 volts, when the battery voltage rises to exceed the reference voltage within a predetermined charging time period, and terminating the supply of current to the battery when the battery voltage does not rise above the reference voltage within the predetermined charging time period or the reference voltage reaches the maximum voltage.

44. The method of claim 43 wherein the reference voltage is increased by discrete amounts up to the maximum reference voltage each time that the battery voltage rises above the reference voltage within the predetermined charging time period.

45. The method of claim 44 including:

increasing the charging current being supplied to the battery from time to time during a testing period by from about 2.5% to about 25% and maintaining the increased charging current substantially constant during the testing period;

terminating the supply of current to the battery when the battery voltage increases by a predetermined amount within the testing period while the increased, substantially constant charging current is being supplied to the battery.

46. The method of claim 45 wherein the charging current is increased a predetermined time after an increase of the reference voltage.

47. A battery charger for charging batteries of different sizes, comprising:

means for supplying charging current from a power source;

contact means including at least one contact element through which charging current is supplied from said charging current supplying means to a battery;

means for holding a single battery in electrical connection with said contact means; and an adjustable circuit which controls the magnitude of charging current supplied by said charging current supplying means to the battery held by said battery holding means, said contact element being movably mounted in said battery holding means to accommodate and electrically connect batteries of different sizes, and means mechanically coupling said contact element with said adjustable circuit such that said charging current supplying means supplies charging currents of values dependent upon the position of said contact element.

48. The battery charger of claim 47 wherein said adjustable circuit comprises resistance coupled to said charging current supplying means, and wherein the position of said contact element determines the value of said resistance.

49. The battery charger of claim 48 wherein said resistance is coupled in series with said contact element and said charging current supplying means.

50. A battery charger for charging a plurality of batteries of the same or different size, particularly but not exclusively alkaline batteries, comprising:

a contact means for each battery to be charged including a contact element through which charging current is supplied to a respective battery;

a means for each battery to be charged for holding a single battery to be charged in electrical connection with a respective contact means;

means for supplying substantially constant charging current from a power source to respective contact means of respective battery holding means essentially independently of the charging current supplied to any other contact means;

an adjustable circuit for each contact means which controls the magnitude of the charging current supplied by said current supplying means to the respective contact means;

said contact element of a respective contact means being movably mounted in a respective battery holding means to accommodate and electrically connect to the respective contact means batteries of different sizes; and means mechanically coupling said contact element of a respective contact means with said adjustable circuit such that movement of a respective contact element adjusts a respective adjustable circuit and causes said current supplying means to supply charging currents to respective contact means of values dependent upon the position of a respective contact element.

51. The battery charger of claim 50 wherein each adjustable circuit comprises resistance coupled to said current supplying means, and wherein the position of a respective contact element determines the value of a respective resistanace.

52. The battery charger of claim 51 wherein a respective resistance is coupled in series with a respective contact element and said current supplying means.

53. A battery charger for charging a plurality of batteries of the same or different size, particularly but not exclusively alkaline batteries, comprising:

- a plurality of circuits coupled to a source of power, each circuit including a holding means for holding therein a single battery of any size of a plurality of different sizes and for supplying charging current to said battery from the power source, contact means for electrically connecting a respective circuit to a battery held by a respective holding means, and resistance in series with said contact means such that charging current supplied to a respective battery flows through a respective resistance, each said resistance being selectable in magnitude;

- each said circuit supplying charging current to the battery held by the respective battery holding means essentially independently of any other circuit such that two or more circuits may supply charging current to respective batteries continuously and simultaneously in response to said controlling means, and to terminate the supply of charging current to respective batteries in response to said controlling means; and

- means associated with each of said circuits responsive to the size of a battery held by an associated holding means of a respective circuit for automatically selecting a magnitude of a respective resistance of a respective circuit, whereby the charging current supplied by a respective circuit to a respective battery in a respective holding means is selectable independently of charging current supplied by any other circuit to any other battery.

54. The battery charger of claim 53 including means for controlling the charging of each battery in a holding means, each said circuit being responsive to said controlling means to supply supply of charging current to respective batteries and terminate charging current of respective batteries.

55. The battery charger of claim 53 wherein said battery charger includes a separate controlling means for each circuit for controlling charging of only the battery held by the respective holding means of the respective circuit.

56. The battery charger of claim 53 wherein said battery charger includes a single controlling means for all of said circuits for controlling charging of respective batteries held by the respective holding means of the respective circuits.

* * * * *